(12) United States Patent
Montagnon et al.

(10) Patent No.: US 9,680,865 B2
(45) Date of Patent: Jun. 13, 2017

(54) RELIABLE USER-DEVICE CONTENT AND MEDIA DELIVERY APPARATUSES, METHODS AND SYSTEMS

(71) Applicant: Secret Media Inc., New York, NY (US)

(72) Inventors: Frédéric Montagnon, New York, NY (US); Julien Romanetto, New York, NY (US)

(73) Assignee: Secret Media Inc., New York, NY (US)

( * ) Notice: Subject to any disclaimer, the term of this patent is extended or adjusted under 35 U.S.C. 154(b) by 86 days.

(21) Appl. No.: 14/511,246

(22) Filed: Oct. 10, 2014

(65) Prior Publication Data

US 2016/0105449 A1   Apr. 14, 2016

(51) Int. Cl.
*H04L 29/06* (2006.01)
*H04L 29/08* (2006.01)

(52) U.S. Cl.
CPC ........ *H04L 63/145* (2013.01); *H04L 63/1466* (2013.01); *H04L 67/06* (2013.01); *H04L 67/2814* (2013.01)

(58) Field of Classification Search
None
See application file for complete search history.

(56) References Cited

U.S. PATENT DOCUMENTS

| | | | |
|---|---|---|---|
| 7,058,633 B1 | 6/2006 | Gnagy et al. | |
| 8,364,712 B2 * | 1/2013 | O'Sullivan | G06F 17/3087 707/783 |
| 9,043,894 B1 * | 5/2015 | Dennison | H04L 63/1408 726/11 |
| 2001/0044780 A1 * | 11/2001 | Miyazaki | G06F 21/10 705/53 |
| 2002/0133720 A1 * | 9/2002 | Sherman | H04L 63/0236 726/13 |
| 2004/0261096 A1 | 12/2004 | Matz | |
| 2005/0021818 A1 * | 1/2005 | Singhal | H04L 67/20 709/232 |
| 2005/0044185 A1 | 2/2005 | Hind et al. | |

(Continued)

OTHER PUBLICATIONS

"Ad-Aware User Manual", 2010, Lavasoft, p. 1-72.*

(Continued)

*Primary Examiner* — Christopher Revak
(74) *Attorney, Agent, or Firm* — Cooley LLP

(57) ABSTRACT

The RELIABLE USER-DEVICE CONTENT AND MEDIA DELIVERY APPARATUSES, METHODS AND SYSTEMS ("SEME") can allow for the delivery of electronic content in malware and security-comprised user-device environments. Embodiments of the SEME allow for the efficient use of user-device bandwidth by invoking secondary or tertiary content delivery channels only when the primary source of device content is actually compromised, when attempted content retrieval has been intercepted by malware, or when the normal content delivery vector has otherwise been rendered unavailable to the user-device. In some embodiments, the SEME transforms user device content delivery requests, via SEME components, into reliable delivery injection packages and content delivery outputs in order to ensure reliable content delivery.

20 Claims, 10 Drawing Sheets

Example: Reliable Content Delivery

(56) References Cited

U.S. PATENT DOCUMENTS

| | | | | |
|---|---|---|---|---|
| 2008/0091606 A1* | 4/2008 | Grecia | ................. | G06Q 20/123 |
| | | | | 705/51 |
| 2009/0293101 A1* | 11/2009 | Carter | ................. | G06F 21/6209 |
| | | | | 726/1 |
| 2014/0130160 A1* | 5/2014 | Golovanov | ......... | H04L 63/1441 |
| | | | | 726/23 |

OTHER PUBLICATIONS

"Adblocker tutorial", no date provided, adblockplus.org/tutorials, p. 1-5.*

European Search Report, mailed Feb. 25, 2016 for EP Application No. 15189409.4, filed Oct. 12, 2015.

\* cited by examiner

Example: Reliable Content Delivery via Proxy Serving

Example: Delivery Function & Counter-Function Code Generation, e.g., EOB Component

US 9,680,865 B2

RELIABLE USER-DEVICE CONTENT AND MEDIA DELIVERY APPARATUSES, METHODS AND SYSTEMS

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Some embodiments relate to the provision of device and server services related to the delivery of media and content in situations where normal content delivery channels are compromised or otherwise unavailable. Compromised delivery channels may be due to malware present on a user-device, hijacking or other content manipulation or suppression software either in or related to the user's browser software installation, a compromised content delivery server, a compromised intermediate delivery server such as a proxy server, and/or the like.

BACKGROUND

The web uses decentralized server architectures to increase content delivery efficiency. For example, a single web page may incorporate content and media from many different specialized servers. However, some of the specialized servers employed may not be controlled by the web page publisher. A decentralized system may be vulnerable to attack or hijacking which may lead to desired content being unavailable when needed.

Figure 1:
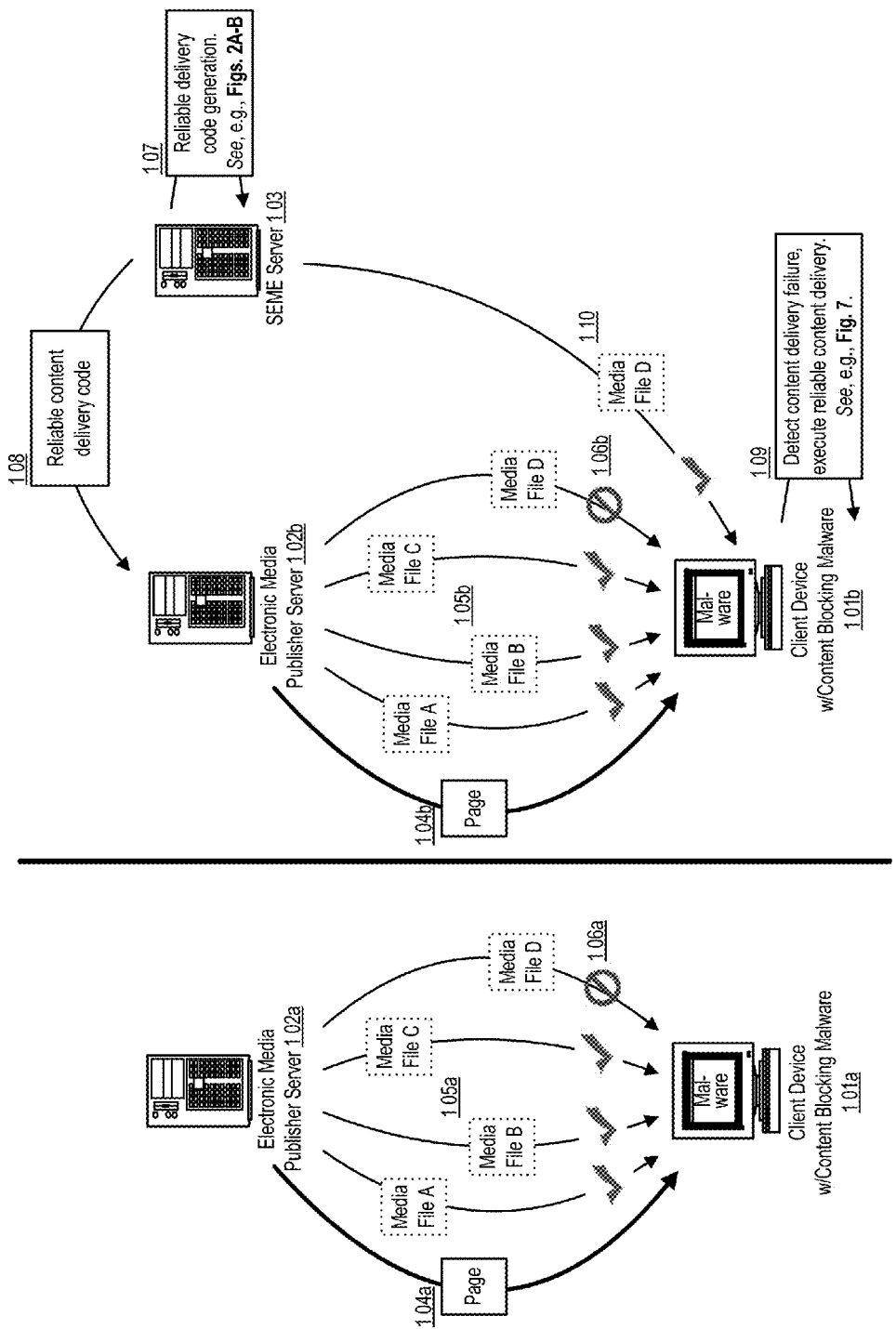
FIG. 1 shows an example block diagram illustrating aspects of reliable content delivery, in one embodiment of the SEME.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2A, 2B, etc.

DETAILED DESCRIPTION

In some embodiments, an RELIABLE USER-DEVICE CONTENT AND MEDIA DELIVERY APPARATUSES, METHODS AND SYSTEMS (hereinafter "SEME") transforms user device content delivery requests, via SEME components, into reliable delivery injection packages and content delivery outputs in order to ensure reliable content delivery.

As discussed herein, the SEME may be configured to provide for the reliable delivery of content to user devices in instances where the content would otherwise be (or is) at risk of being blocked. Content may be thought of as any piece of the user experience intended by a publisher to be delivered to an end user. As such, content includes video, audio, images, and all of the component metadata structures and content descriptor structures (including HTML) utilized by a publisher in delivering content to an end user. Content blocking may occur for a variety of reasons including but not limited to, malware installed on the user device, a compromised publisher server, a browser add-on installed by a user, the manipulation of content between the source server and the client device, and/or the like. However, by utilizing the capabilities of the SEME, the delivery of publisher intended content may be insured. Additionally, the SEME may facilitate the delivery of content indicated by a publisher server but intended to be delivered by a third-party server (e.g., outsourced content delivery such as through a Content Delivery Network). When content is served from a third-party server, it may be more likely to be blocked by malware and/or the like, and therefore the capabilities of the SEME may assist in reliable content delivery.

The SEME reliable delivery capabilities discussed herein are applicable both at the stage when an HTML and/or the like page is being provided by a publisher to a client device for rendering as well as after the rendering of the page has begun on the client device and additional content and/or media files referenced by the page are being loaded by the client device. For example, a page may contain a reference to a publisher video file in the form of a Digital Video Ad Serving Template (a "VAST file"). The SEME may, in such an embodiment, assist with both the delivery of the VAST file itself as well as the delivery of the underlying video media content referenced by the VAST file. Since malware and/or content blocking software may intervene at any point in the content delivery chain, the embodiments discussed herein are applicable both to the delivery of "ultimate" content (such as, for example, a video file itself) as well as the delivery of intermediary files that enable the ultimate content delivery (such as, for example, a VAST file, HTML file, JavaScript source file, and/or the like). Furthermore, the SEME enables publishers to better track the performance of their provided or referenced content by assisting with the delivery of user-experience/interaction trackers and by preventing the hijacking of tracker data by unintended third-parties. By utilizing the capabilities of the SEME, the experience of both the publishers and consumers of content is bettered due to the increased reliability of content delivery between the two parties and the suppression of interference by third-parties in the content delivery process.

FIG. 1 shows an example block diagram illustrating aspects of reliable content delivery, in one embodiment of the SEME. In one embodiment, the SEME can prevent content from being blocked or intercepted during or after delivery. For example, electronic media publisher server 101a may transmit page 104a to a client device that has malware installed 101a. The page 104a may be, for example, an HTML page. In other cases, the page may in actuality be a media content descriptor file, such as a Digital Video Ad Serving Template (e.g., a VAST file). The malware installed on the client device may be, for example, software that is run unbeknownst to the user that intercepts video streams from a source publisher and alters or embeds undesired content into the feed. In other cases the malware may be considered software that the user affirmatively installed and is aware of but that has extended its behavior beyond that contemplated by the user at installation. The client device with malware 101a may thereafter parse the page 104a and request one or more media files 105a needed to render the page. Media files 105a may be, for example, video, audio or image files. Media files may also be other file formats including text files, URL hyperlinks, pointers to other media files, pointers to image or video files, HTML files, "trackers" (e.g., images or other files used for tracking a user's web page interactions), content definition files, and/or the like. However, as illustrated, one or more of the media files may be blocked during delivery to the requesting client device with malware 101a, e.g., 106a. The blocking may in some cases occur while the file is in transit between electronic media publisher server 101a and client device with malware 101a. In other cases, the blocking may occur after the content has arrived at the client device with malware 101a. For example, the malware itself may intercept or replace the content such that the requesting computer process on the client device does not receive the correct content or receives no content at all. In other cases, the malware may cause the client device to request the media from a different server controlled by the malware.

Embodiments of the SEME may alleviate the content delivery failures noted by above by providing reliable delivery services to, for example, electronic media publisher server 102b. In one embodiment, the electronic media publisher server 102b may request or automatically receive custom code for use in assuring content delivery. The request may be asynchronous from the request for page 104b (unshown) by client device with malware 101b, or it may be performed in real-time (e.g., upon receiving a request for a page, the electronic media publisher server 102b requests the SEME server 103 to generate and provide reliable server code). In one embodiment, the SEME server may generate reliable delivery code, e.g., 107, and forward the code to the electronic media publisher server 102b, e.g., 108. Further detail regarding the generation of reliable delivery code by the SEME may be found herein and particularly with respect to FIGS. 2A-B. The electronic media publisher server 102b may thereafter integrate the code into page 104b prior to delivery to a client device with malware 101b. During rendering of the page described by page file 104b, the client device with malware 101b may request component media files required to render the page, e.g., 105b, and one or more of the component media files may be blocked either in transit or upon delivery to the client but before delivery to the true requesting process, e.g., 106b. In such cases, the reliable delivery code 108, incorporated into page 104b and executing on client device with malware 101b, may determine that one or more media files (e.g., Media File D) have been blocked, e.g., 109. Further detail with respect to determining that a media or content file has been blocked may be found herein and particularly with respect to FIG. 7. In one embodiment, the client device with malware 101b may then further execute the SEME reliable content delivery code obtained via page 104b in order to effect delivery of the previously blocked content. For example, the code may cause client device with malware 101b to request Media File D from an alternative source or directly from SEME Server 103, e.g., 110.

Figure 2A:
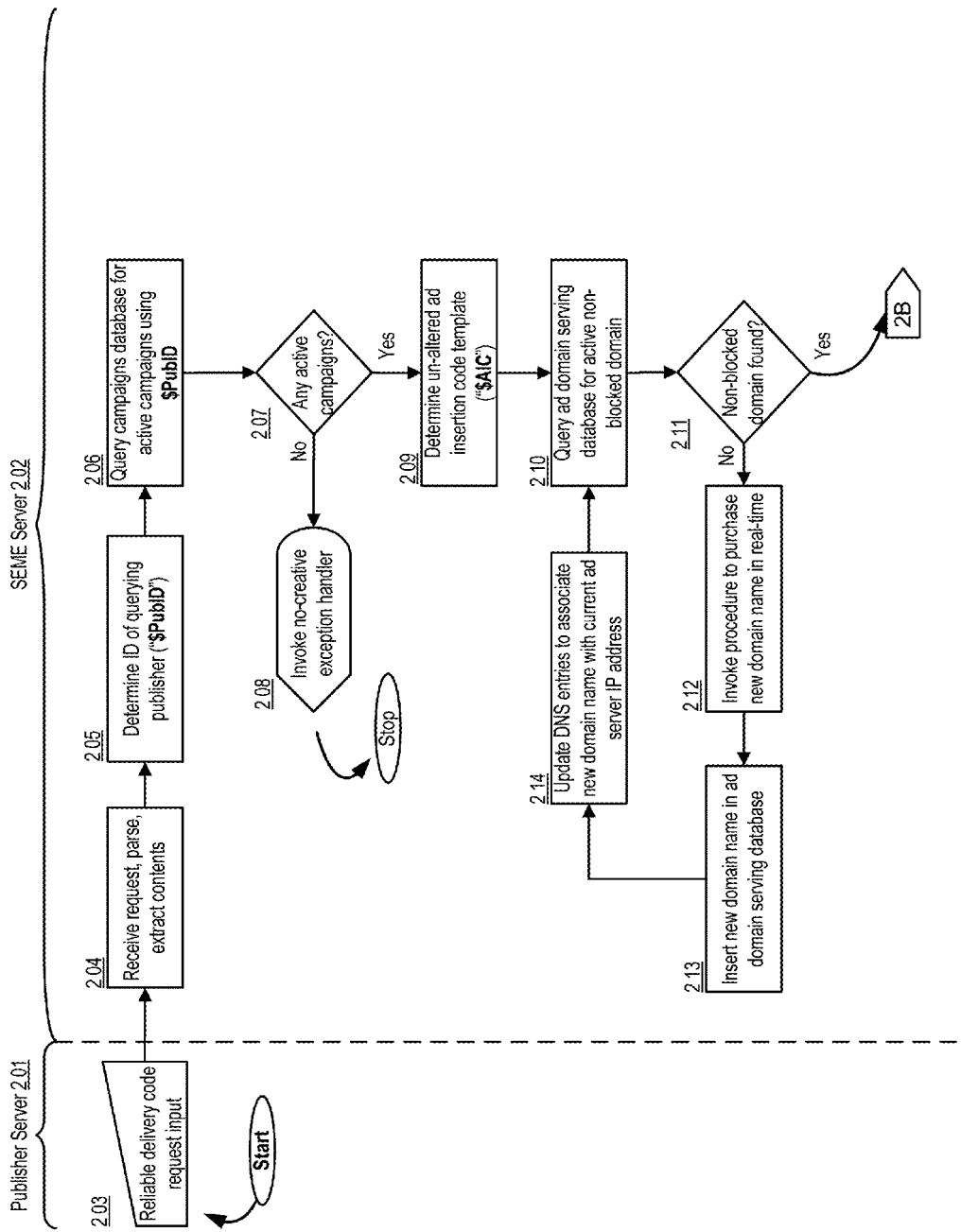
FIGS. 2A-B show an example logic flow illustrating aspects of reliable delivery code creation, e.g., an example CDC Component, in one embodiment of the SEME.
Figure 2B:
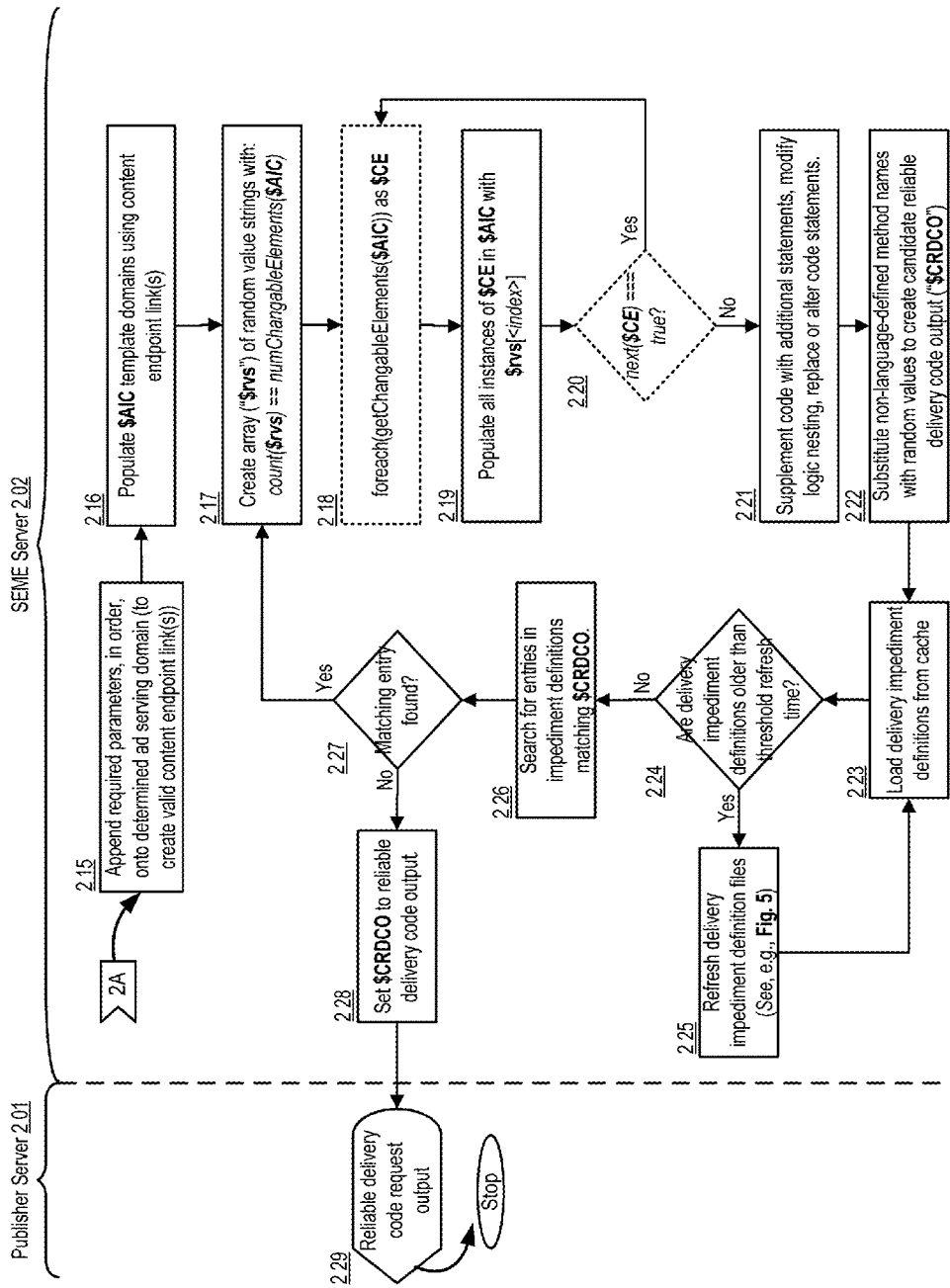

FIGS. 2A-B show an example logic flow illustrating aspects of reliable delivery code creation, e.g., an example CDC Component, in one embodiment of the SEME. In one embodiment, publisher server 201 may contact SEME server 202 in order to request assistance to effect reliable content delivery, e.g., reliable delivery code request input 203. The request may be considered a request to generate code suitable for insertion into an HTML (or similar) page. The generated code is then inserted by the requesting server, such as a content publisher's server, and provided to a third-party requesting a page from the publisher server. The reliable delivery code, when executed on a client device (e.g., the device receiving the page with the reliable delivery code integrated therein), may detect when one or more media files referred to by the page (and which the client-device browser therefore tries to load) experienced a delivery failure. The reliable delivery code running on the client then facilitates the delivery of the intended content or a suitable alternative thereto. In some embodiments, this "roll-over content delivery" is done by contacting the SEME server that initially provides the reliable content delivery code. In other cases, the code is provided by the SEME server while the roll-over content delivery is handled by another content server. In some cases, the roll-over content delivery server may be in fact the publisher server. In still other embodiments, the SEME server is contacted to provide the roll-over content but then itself contacts the publisher or third-party server (e.g., the SEME server acts as a content proxy server).

In one embodiment, the SEME server 202 receives the reliable delivery code request input 203, e.g., 204. The SEME server 202 may then determine a publisher associated with the request. For example, the request may include an ID of a publisher utilizing the SEME. In other embodiments, the source of the request, the content requested, or another similar parameter may be drawn from or determined from the request input in order to determine the source publisher requesting reliable content delivery code. In one embodiment, the SEME may then query a campaigns database in order to determine an active campaign associated with the publisher, e.g., 206. The campaigns database may be local or remote. For example, in alternative embodiments the SEME server contacts a publisher's ad server itself in order to determine an active campaign. Such a configuration may reduce the need to maintain records of alternate content sources directly with the SEME since such information can be retrieved in real-time. If the SEME server 202 determines that there are no active campaigns for the publisher (and, by extension therefore, no need for reliable content delivery services), e.g., 207, then SEME server 202 may raise a no-creative exception handler. If, instead, the SEME server 202 determines there are one or more active publisher campaigns, the server may locate an insertion template associated with one or more of the campaigns, e.g., 208. An example insertion code template, substantially in the form of a text file containing pseudo-code with double-bracketed placeholders is:

```
<script language=JavaScript">
function d( ){
    var b = document.getElementsByTagName("body")[0];
    var a = document.createElement("div");
    a.id = "ad_ad";
    a.setAttribute("style","height:1px;width=1px;
                           display:block;position:fixed");
    b.appendChild(a);
    if($("#ad_ad").filter(":visible").length==1)return 0;
    else return 1;
}
if(d( )==1){
    $.getScript("[[LOG-RCD]]");
    $.getScript("[[CONTENT-ENDPOINT-LINK]]").done(
        function(script, textStatus) {
            $.getScript(t( )).done(function( script, textStatus ) {
                [[CONTENT-INSERTION-LOOP]]
            });
        });
}
else{
    $.getScript("[[LOG-NO-RDC]]");
}
</script>
```

Reliable content delivery is often frustrated by the unavailability of a primary source server, the Mocking of a primary source server, and/or the like. Some of this Mocking occurs because of malware configured to target content from certain server domains. For example, malware may redirect or block requests for media from all government websites by looking for the identifiable domain suffix (e.g., ".gov"). Therefore, the SEME may employ a real-time domain rotation capability in order to militate against such content blocking tactics. Some embodiments of the SEME may additionally monitor which domains are impacted (e.g., which domains are non-reliable content delivery sources) by using content blocking and/or malware definition files (e.g., delivery impediment definition files). By monitoring the delivery impediment definition files, the SEME may seamlessly rotate domains in and out of service as their delivery utility for a particular publisher increases or decreases. Further detail regarding using and updating delivery impediment definition files in reliable content delivery and reliable content delivery code generation may be found herein and particularly with respect to FIG. 5.

In one embodiment, a domain rotation database is queried for an active and non-blocked (e.g., not blocked by current delivery impediment definition files) domain name, e.g., 210. If no active non-blocked domains are found, e.g., 211, then a new domain may be purchased in real time, e.g., 212. Such a purchase may be completed by creating a random string domain string (e.g. {randomstring}.com) and purchasing the domain name using a domain registrar's purchase API. In other embodiments, the SEME may keep a cache of pre-purchased but unused (e.g., non-blocked, inactive) domains and draw a new domain from that cache. The purchased domain name may be configured in real-time. For example, name server records may be created in order to make the domain resolvable, and/or the like. Once configured, the new domain may be added as an active domain in the domain rotation database, e.g., 213. In one embodiment, DNS A-records may then be created to point to the SEME server 202 or another content delivery server, e.g., 214. In one embodiment, if an active and non-blocked domain is found, e.g., 211, then the SEME server 202 may append required parameters onto the domain in a predetermined order, e.g., 215. This ordering may vary by template and therefore is capable of defeating malware delivery blocking files as well. The parameters may include, for example, the publisher ID, a content or ad ID, a user "tracker" ID, an ID associated with the target URL for a content link, and/or the like. For example, if the selected active non-Mocked domain name is "randstring.com", the SEME may create a content end point link such as "randstring.com/1/5/4/7" where "1" represents an advertiser ID, "5" represents the publisher ID, "4" is a user specific ID and "7" is a random value ID derived according to a formula in the insertion code template. Further detail regarding content end point parameter ordering can be found herein and particularly with respect to FIG. 8. In one embodiment, the content endpoint link may then be substituted into the insertion code template at predetermined marker points in the template, e.g., 216.

In one embodiment, in order to further ensure reliable content delivery, the domain selection and rotation capabilities discussed above may be supplemented with selective randomization of the reliable delivery code. The randomization may be performed in a manner that maintains code functionality (e.g., causes substantially the same behavior upon execution as the unrandomized code). Furthermore, in one embodiment, actual randomness is not necessary in order to perform the capabilities of the SEME and therefore values that appear random (e.g., pseudo-random values) may be sufficient for reliable content delivery. In one embodiment, the SEME server 202 may determine the number of changeable elements in the populated code template. Changeable values are values within the populated code template that can be changed while maintaining code behavior. For example, function names may be replaced so long as all references to the function from other portions of the populated code template are replaced as well. Similarly, the name of variables may be changed so long as all uses are updated. In one embodiment, for each changeable element, a random value string comporting with the language requirements (e.g., length, characters, etc.) may be generated, e.g., 217. Thereafter, for each changeable element, e.g., 218, all instances of the element in the populated code template may be replaced with the random value string, e.g., 219. The procedure may repeat until all changeable elements have been processed, e.g., 220. By replacing all instances of a replaceable element, overall behavior of the code may be maintained.

In one embodiment, additional language specific statements may be added to the populated code template and other transformations may be performed on the populated code template in order to further ensure reliable delivery, e.g., 221. For example, a variable may be created and assigned to a random value string. Since the variable will be unused by the code, its presence will have no effect on code behavior. In a further example, code can be nested inside conditional or loop structures that always execute. For example, the following code example, substantially in the form of JavaScript statements, may be supplemented using the above procedure:

```
<script language="JavaScript">
    var content_endpoint = "http://semeserver.com/1/4/7/2";
    var tracker_id = 54332432;
    if (document.getElementById("testDiv").offsetLeft < 0
            && tracker_id > 0) {
        var img = new Image( );
        img.src = "http://fortrresres.com/765.jpg";
        ...
    }
</script>
```

The code above may have additional statements added and be further nested without impacting its execution behavior. This transformation, advantageously, may facilitate the reliable delivery function of the SEME. In one embodiment, the code above may, after transformation 221, appear similar to the following code example substantially in the form of JavaScript statements:

```
<script language="JavaScript">
    var rand7654 = "http://semeserver.com/1/4/7/2";
    var jr5454 = 54332432;
    if (1 < 2) {
        if (document.getElementById("testDiv").offsetLeft < 0
                && jr5454 > 0) {
            var fooin767 = new Image( );
            fooin767.src = "http://fortrresres.com/765.jpg";
            ...
        }
    }
</script>
```

In one embodiment, the SEME server 202 may then change some method names within the populated code template to random values, e.g., 222. Methods may, in some programming languages, be either language or programmer defined. Therefore, only method names that do not correspond to methods defined by the programming language itself are replaced by the SEME. Language defined methods, however, may have their calls adjusted in a manner that does not effect code execution (such as, for example, specifying default parameters, and/or the like).

Upon performing the above procedure, or a subset of it, a reliable delivery candidate code output may be created. However, the SEME may, in one embodiment, now compare the generated code against one or more delivery impediment definition files. The delivery impediment definition files may be loaded from a local or remote cache, e.g., 223. The delivery impediment definition files may be the same files used by the domain selection procedure discussed earlier. Since the delivery impediment definition files may be frequently updated by malware or other content blockers in order to attempt to circumvent the reliable delivery capabilities of the SEME, in one embodiment, the delivery impediment definition files are first examined to determine their last refresh time. If the delivery impediment definition files are older that the allowed SEME administrator defined time quantum, e.g., 224, then the delivery impediment definition files may be refreshed before use, e.g., 225. An example refresh time quantum is five minutes. Further detail with regard to delivery impediment definition files use and updating may be found herein and particularly with regard to FIG. 5. In one embodiment, if the delivery impediment definition files are not expired, e.g., 224, then the entries in the delivery impediment definition files are compared against the reliable delivery candidate code output, e.g., 226. For example, if the delivery impediment definition files contain regular expression ("regex") entries, then each entry may be compared against the reliable delivery candidate code output. If any regex matches the reliable delivery candidate code output, e.g., 227, then a portion of the procedure may repeat to produce another candidate reliable delivery candidate code output. However, if no regex matches the reliable delivery candidate code output, e.g., 227, then the candidate code output is considered acceptable reliable delivery code, e.g., 228, and thereafter returned to publisher server 201 as the reliable delivery code request output 229.

Figure 3:
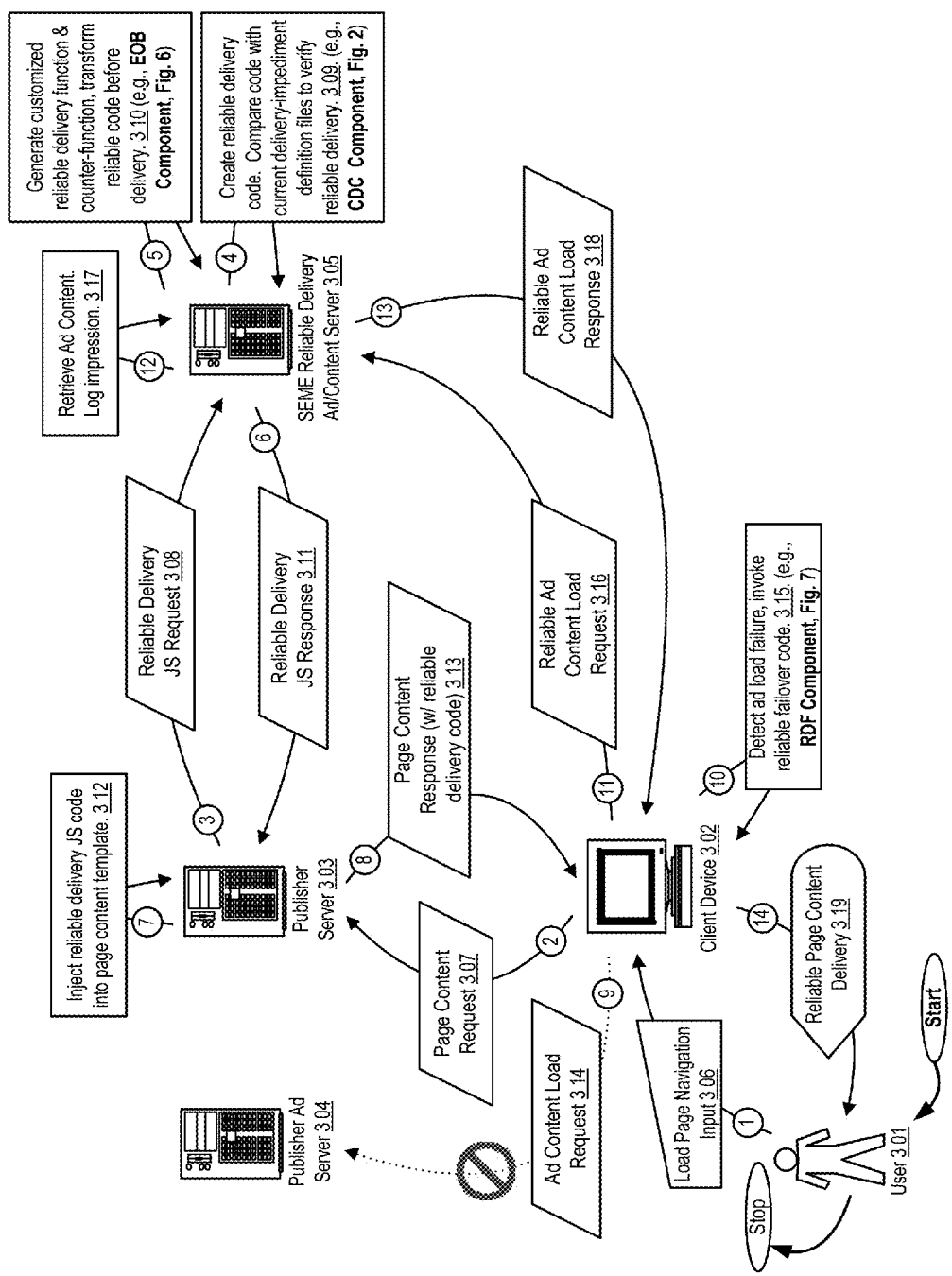
FIG. 3 shows an example data flow illustrating aspects of direct reliable content delivery, in one embodiment of the SEME.

FIG. 3 shows an example data flow illustrating aspects of direct reliable content delivery, in one embodiment of the SEME. In one embodiment, user 301, in communication with client device 302, may provide input sufficient to request that the client device load an HTML page, a media file, a content file, and/or the like from publisher server 303, e.g. load page navigation input 306. The load page navigation input 306 may be a tap, a double tap, a mouse click, a user gesture, a user eye movement, or any other input discernible by client device 302. The client device 302 may be a computer, a server, a smart phone, a tablet PC, and/or the like. Although illustrated here in the context of a user providing direct input, client device 302 may, in other embodiments, behave on behalf of the user in an autonomous or semiautonomous manner. For example, depending on the location of user 301, client device 302 may retrieve appropriate content from publisher server 303.

In one embodiment, upon receiving the load page request, client device 302 may initiate a page content request 307 to publisher server 303. For example, an HTTP GET request for a page. Publisher server 303, in the illustrated embodiment, has been configured to utilize the reliable content delivery capabilities of the SEME by requesting services from SEME reliable delivery ad/content server 305. In other embodiments, the procedure outlined with respect to the SEME reliable delivery ad/content server 305 may be performed by publisher server 303. For example, a SEME module may be provided by a SEME administrator and thereafter installed on publisher server 303 to perform the capabilities currently illustrated as being performed by SEME reliable delivery ad/content server 305. In the illustrated embodiment, publisher server 303 requests reliable delivery code, such as JavaScript code, for insertion into a page being served by publisher server 303 to client device 302, e.g. reliable delivery JS request 308. A reliable delivery JS request 308 may be generated by the publisher server 303 using code configured to assemble and issue the reliable delivery JS request 308. An example reliable delivery JS request 308 request generation program, substantially in the form of a PHP program run by publisher server 303, is:

```
<?PHP
    $service_url = 'http://api.SEMEserver.com/
                    getReliableDeliveryCodeJS/';
    $curl_get_data = array(
        "formats" => urlencode('
                    {"1":"banner_top","2":"square_right"}'),
                    "auth" => 'ab56653476edb90987623a598dcba064d',
                    );
    $params = http_build_query($curl_get_data);
    $curl = curl_init($service_url.'?'.$params);
    curl_setopt($curl, CURLOPT_RETURNTRANSFER, true);
    $curl_response = curl_exec($curl);
    if($curl_response!=''){
        $json=json_decode($curl_response);
        curl_close($curl);
        $header = $json->header;
        echo $header;
    }
?>
```

In one embodiment, upon receiving the reliable delivery JS request 308, SEME reliable delivery ad/content server 305 will create reliable delivery code for use by publisher server 303. Additionally, prior to providing the code, the SEME reliable delivery ad/content server 305 may compare the code with one or more delivery impediment definition files to verify that the code generated will indeed ensure reliable content delivery, e.g. 309. Further detail with respect to the generation of reliable delivery code may be found herein and particularly with respect to FIG. 2, e.g., an example CDC Component. In another embodiment, example code for performing the functions of a CDC Component, substantially in the form of a PHP program, is:

```
<?php
/*
 * Generate reliable delivery code
 * e.g., example CDC Component 309
 *
 * Publisher requests code, below creates block which
 * is sent to publisher. Publisher inserts code into
 * page then serves page to client device
 */
private function getCodeJS( ){
  //validate request method
  if($this->get_request_method( ) != "GET"){
    $this->response('',406);
  }
  //authenticate
  list($id_publisher,$id_revive) =
        $this->auth($this->_request['auth']);
  //generate reliable delivery code
  if($id_publisher>0){
    //get domain from domain rotation db
    $sql = $this->db->query("
          SELECT domain_name FROM domain_rotation
          WHERE
          status=1 AND id_publisher='".$id_publisher."'");
    if(mysqli_num_rows($sql) > 0){
      $r = mysqli_fetch_row($sql);
      $domain = $r[0];
    }
    else{
      $domain = DOMAIN_NAME_DEFAULT;
    }
    $formats = json_decode(urldecode(
          $this->_request['formats']));
    $var['domain_name'] = 'www.'.$domain;
    $var_div_id = generateRandomString( );
    $var_prefix = PREFIX_REVIVE;
    //build JS to detect delivery blocking on client device
    $jsAdBlockDetector='function d( ){var b =
      document.getElementsByTagName("body")[0];var a =
      document.createElement("div");a.id =
      "ad_ad";a.setAttribute("style","height:1px;
      width=1px;display:block;position:fixed");
      b.appendChild(a);if($("#ad_ad").
      filter(":visible").length==1)return 0;else return 1;}';
    //log reliable delivery invocation,
    //build content endpoint link
    $jsCore="if(d( )==1){$.getScript(\"
      http://".$var['domain_name']."/h".generateRandomString(7).
      ".".generateRandomString(3).".'?'.generateRandomString(5).
      "=1&".generateRandomString(5)."=".$id_publisher."\");
      $.getScript(\"http://".$var['domain_name'].
      "/p".generateRandomString(8).".".generateRandomString(3).
      "?".generateRandomString(7)."=".$id_revive.
      "&".generateRandomString(4)."=_blank\").
      done(function( script, textStatus ) {$.getScript(t( )).
      done(function(script, textStatus ) {";
    //insert as many content blocks as requested
    //configure insertion at correct DIV; replace prefix
    foreach($formats as $key =>$value){
      $sql = $this->db->query("
            SELECT js FROM format WHERE
            id_publisher='".$id_publisher."'
            AND zone='".$value."'");
      if(mysqli_num_rows($sql) > 0){
        $code = mysqli_fetch_row($sql)[0];
        $code = preg_replace("/___divid___/",$var_div_id, $code);
        $code = preg_replace("/___prefix___/", $var_prefix, $code);
        $jsCore.=$code;
      }
    }
    //log if reliable delivery is NOT invoked
    $jsCore.="})}).$.getScript('http://".$var['domain_name'].
      "/F".generateRandomString(5).".".generateRandomString(4).
      "");}else{ .getScript(\"http://".$var['domain_name'],
    "/h".generateRandomString(4).".".generateRandomString(3).
    '?'.generateRandomString(7)."=0&".generateRandomString(5).
    "=".$id_publisher."\");}</script>";
    //load jquery library
    $jquery_load = '<script src="
          http://ajax.googleapis.com/ajax/libs/
          jquery/1.11.0/jquery.min.js"></script>';
    //return the reliable delivery JS code
    $result['header'] = $jquery_load.'
          <script type="text/javascript">'.
          $jsAdBlockDetector.$jsCore.'</script>';
    //close request handler with success
    $this->response($this->json($result), 200);
  }else{
    //close request handler with failure
    $this->response('',203);
  }
}
?>
```

In one embodiment, prior to the return of the reliable delivery code to publisher server 303, the SEME reliable delivery ad/content server 305 may perform additional transformations on the generated reliable delivery code in order to further ensure the delivery of the content intended to be delivered by publisher server 303. For example, in one embodiment, the SEME reliable delivery ad/content server 305 may generate a customized reliable delivery function and counter-function. The pair of functions may be utilized to hinder access to the reliable delivery code itself without access to the generated counter-function. In so doing, malware running on client device 302 may not easily determine the target content or target server associated with the content being loaded. Although not illustrated herein in the context of an encryption function, the SEME may in fact utilize reversible encryption, such as AES encryption, to perform the function and counter-function reliable code transformations illustrated herein. In one embodiment, the transformed reliable delivery code is sent to publisher server 303 and ultimately to client device 302, along with or containing the generated counter-function. The counter-function, with sufficient execution privileges on client device 302, may then be used by the intended process running on client device 302 to determine and execute the reliable delivery code while minimizing interference from malware that may be inspecting the document object model ("DOM"), of the page being rendered. Further detail with respect to generating custom reliable delivery function and counter-function pairs as well as transforming reliable delivery code before delivery, e.g. 310, may be found herein and particularly with respect to FIG. 6, e.g., an example EOB Component.

In one embodiment, the SEME reliable delivery ad/content server 305 may transmit reliable delivery code to publisher server 303, e.g. reliable delivery JS response 311. The publisher server 303 may then insert or inject the reliable delivery JavaScript code into a page content template, e.g. 312. An example reliable delivery JS response 311, substantially in the form of JavaScript language statements, is:

```
<script language="JavaScript">
  //function to determinate if client device
  //has content blocked
  function d( ){
    var b = document.getElementsByTagName("body")[0];
    var a = document.createElement("div");
    a.id = "ad_ad";
```

-continued

```
        a.setAttribute("style","height:1px;width=1px;
                      display:block;position:fixed");
        b.appendChild(a);
        if($("#ad_ad").filter(":visible").length==1)return 0;
        else return 1;
    }
    //if d( ) returns true, content delivery is blocked
    if(d( )==1){
        //log invocation of reliable content delivery
        $.getScript("http://www.qsqx1gcg2v.pw/hVMTLsMh.Dbo
                    ?aIYYs=1&rMZDR=2");
        //retrieve reliable content. content is a code block to
        //retrieve a JS function to inject two images into view
        $.getScript("http://www.qsqx1gcg2v.pw/pBAgFJJXx.GBQ?
                    BoKmGwu=2&kxIk=_blank").done(
                    function(script, textStatus) {
            //execute the t( ) function returned above to get
            //the html code to insert into the two content positions
            $.getScript(t( )).done(function( script, textStatus ) {
                //ad content position 1
                //call function returned by t( ) to render content
                $('#nydn-header').prepend('<div></div>
                    <div style="width: 990px;height: 90px;
                    margin: 0 auto 15px;padding-top: 2px;
                    overflow: hidden;" id="WoeiDrOWEt2"></div>');
                $('#WoeiDrOWEt2').html(GRshow(2));
                //ad content position 2
                //call function returned by t( ) to render content
                $('#col_300').prepend('<div></div>
                    <div style="height:250px" id="WoeiDrOWEt3"></div>');
                $('#WoeiDrOWEt3').html(GRshow(3));
            });
        });
    }
    else{
        //log that reliable content delivery was NOT needed
        $.getScript("http://www.qsqx1gcg2v.pw/hZcTF.MCC?
                    jjeaKsL=0&XZhsk=2");
    }
</script>
```

Thereafter, the publisher server 303 may return the page content response containing the reliable delivery code, e.g. 313, in response to page content request 307. As illustrated here, publisher server 303 is requesting services of the SEME reliable delivery ad/content server 305 in real time and prior to providing the requested page to client device 302. However, in alternative embodiments, the publisher server 303 may, for example, pre-generate reliable delivery code blocks associated with users, client devices, the publisher, and/or the like.

Upon receipt of the page content response 313, client device 302 may begin to render the page. During rendering, client device 302 may request one or more additional content files from third-party servers, such as publisher ad server 304. However, in some cases, malware running on the client device 302 may intercept, block, or otherwise prevent the loading of such content, e.g. ad content load request 314. In such an instance, the SEME reliable delivery code, embedded within the page provided by publisher server 303 and executing on client device 302, may determine the content load request failure, e.g. 314, and invoke additional capabilities of the reliable delivery code in order to provide secondary or tertiary delivery vectors of the blocked or unavailable content, e.g. 315. Further detail with respect to detecting the failure of content to load and the invoking of appropriate reliable failover code capabilities may be found herein and particularly with respect to FIG. 7, e.g., an example RDF Component.

In one embodiment, client device 302 may thereafter issue a request to the SEME reliable delivery ad/content server 305 in order to obtain the content previously blocked, e.g. reliable ad content load request 316. The SEME reliable delivery ad/content server 305, may then log the request and retrieve the requested content e.g. 317. In other embodiments, the content may be retrieved by SEME reliable delivery ad/content server 305 from a third-party server in real time and then returned to client device 302. In still other embodiments, the SEME reliable delivery ad/content server 305 may be configured to load the content from the actual server blocked from delivery, e.g. publisher ad server 304. Once the content has been retrieved or generated, the SEME reliable delivery ad/content server 305 may provide the content to client device 302, e.g. reliable ad content load response 318. The reliable ad content load response 318 may be the actual content itself, such as for example a video media file, an image file, and/or the like. In other embodiments, however, the reliable ad content load response may be a redirect pointer to a different third-party server that can provide the content. In still other embodiments, the reliable ad content load response 318 may be executable JavaScript statements that are configured to insert HTML content into the page being rendered on client device 302. The injected HTML content may itself be configured with capabilities of the reliable delivery code discussed above. As such, client device 302 may receive the reliable ad content load response 318, execute the statements contained therein which cause the DOM of the page being rendered to be updated, and thereafter request a video file, image file, and/or the like from another server configured for reliable delivery, a third-party server with no reliable delivery capabilities, the SEME reliable delivery ad/content server 305 itself, publisher ad server 304, and/or the like. An example reliable ad content load response 318 substantially in the form of executable JavaScript, is:

```
<script language="JavaScript">
    var GRoutput = new Array( );
    GRoutput['2'] = '';
    GRoutput['2'] +='<"+"ahref=\'http://j.qsqx1gcg2v.pw/
                cmeBWoe.meB?oaparams=2___bid=1___zid=2___
                cb=284696a48f___oadest=http%3A%2F%2F
                www.adv1.com\'target=\'_blank\'><";
    GRoutput['2'] +='imgsrc=\'http://i.qsqx1gcg2v.pw/
                dec703697eab983b2f106b0c1d8bc270.gif\
                \'width=\'728\'";
    GRoutput['2'] +="height=\'90\'alt=\'\'title=\'\'border=\'0\'/>
                <"+"/a><"+"divid=\'beacon_284696a48f\'";
    GRoutput['2'] +="style=\'position:absolute;left:0px;
                top:0px;visibility:hidden;\'><"+"img";
    GRoutput['2'] +="src=\'http://j.qsqx1gcg2v.pw/
                LmeBWoeiD.meB?bid=1&cid=1&
                zid=2&cb=284696a48f\'";
    GRoutput['2'] +="width=\'0\'height=\'0\'alt=\'\' style=\'
                width:0px;height: 0px;\'/><"+"/div>\n";";
    GRoutput['3'] = '';
    GRoutput['3'] +="<"+"ahref=\'http://j.qsqx1gcg2v.pw/
                cmeBWoe.meB?oaparams=2___bid=3___zid=3___
                cb=61f2e84bb6___oadest=http%3A%2F%2F
                www.adv2.com\'target=\'_blank\'><";
    GRoutput['3'] +="imgsrc=\'http://i.qsqx1gcg2v.pw/
                05fe350056e3645ce0859c119845d61d.png
                \'width=\'300\'";
    GRoutput['3'] +="height=\'250\'alt=\'\'title=\'\'
                border=\'0\'/><"+"/a><"+"divid=\'
                beacon_61f2e84bb6\'";
    GRoutput['3'] +="style=\'position:absolute;left:0px;
                top:0px;visibility:hidden;\'><"+"img";
    GRoutput['3'] +="src=\'http://j.qsqx1gcg2v.pw/
                LmeBWoeiD.meB?bid=3&cid=1&zid=3&
                amp;cb=61f2e84bb6\'";
    GRoutput['3'] +="width=\'0\'height=\'0\'alt=\'\' style=\'
                width:0px;height: 0px;\'/><"+"/div>\n";";
    GRoutput['4'] = '';
</script>
```

In one embodiment, upon receiving the reliable ad content load response 318, client device 302 may finish rendering the page associated with page content response 313. Thereafter, client device 302 may return or display to user 301 the reliably delivered page and/or content, e.g. reliable page content delivery 319.

Figure 4:
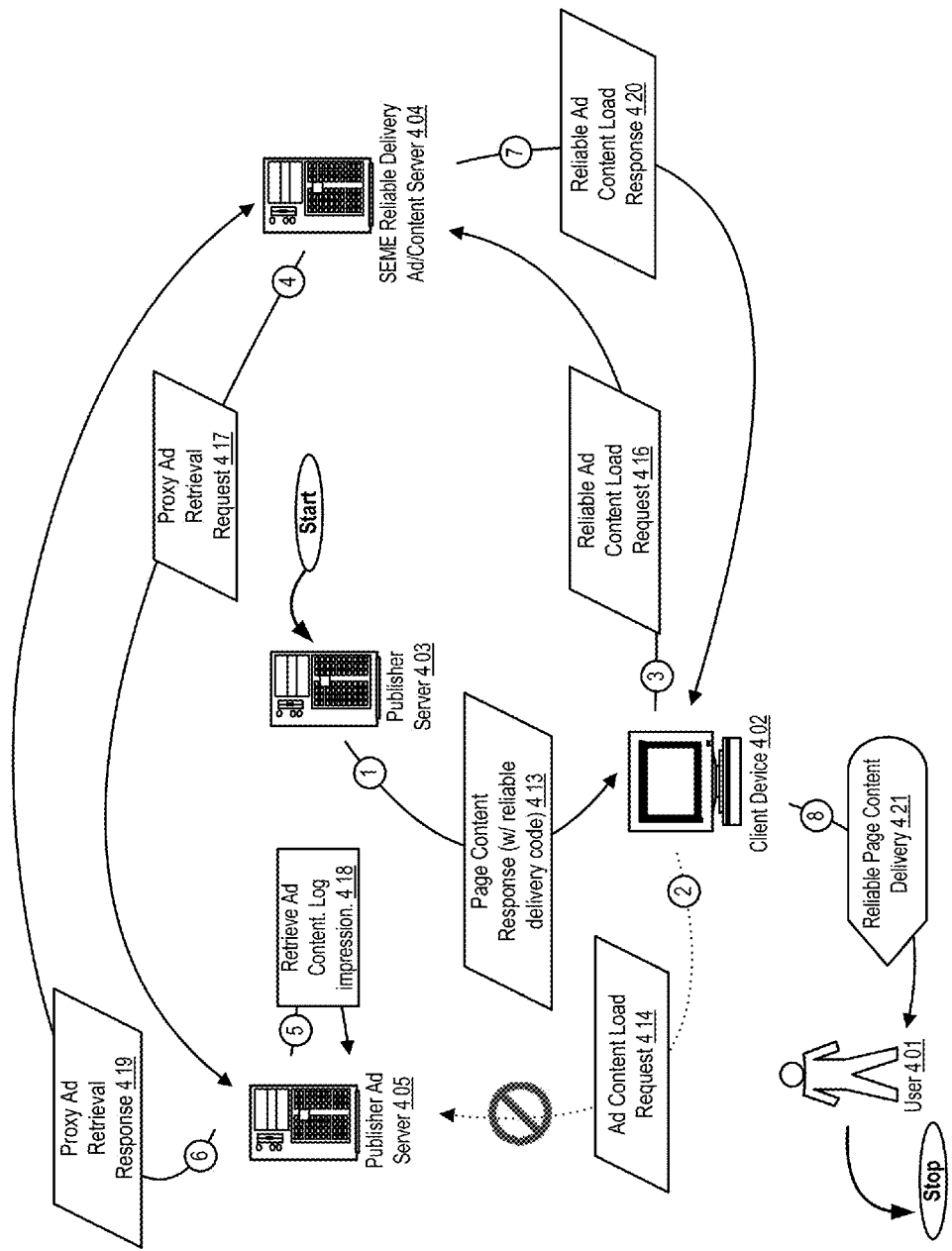
FIG. 4 shows an example data flow illustrating aspects of reliable content delivery via proxy serving, in one embodiment of the SEME.

FIG. 4 shows an example data flow illustrating aspects of reliable content delivery via proxy serving, in one embodiment of the SEME. In one embodiment, publisher server 403 may provide page content with reliable delivery code integrated therein to client device 402, e.g. page content response with reliable delivery code 413. Publisher server 403 may have previously requested and received assistance with the generation of reliable delivery code from the SEME reliable delivery ad/content server 404 using a procedure substantially similar to that outlined herein and particularly with respect to FIG. 3. In one embodiment, client device 402 may render the received page and invoke a request to publisher ad server 405 for content needed, e.g. ad content load request 414. However, as discussed above, the ad content load request 414 may fail due to the unavailability of publisher ad server 405, malware installed on client device 402, a corrupted content file, and/or the like. Therefore, upon determining that ad content load request 414 has failed to be fulfilled, SEME reliable delivery code executing in communication with client device 402 may thereafter issue a reliable ad content load request 416 to SEME reliable delivery ad/content server 404. The reliable ad content load request 416 may be substantially similar to reliable ad content load request 316 discussed above with respect to FIG. 3. However, in the embodiment illustrated, the SEME reliable delivery ad/content server 404 is not configured to provide reliable content delivery from its local data storage. Instead, a proxy ad retrieval request 417 is issued to publisher ad server 405. The request may be performed in real-time upon receiving a reliable ad content load request 416, or content retrieval requests may be made in advance of content load requests in order to have a buffer of available content stored locally on the SEME reliable delivery ad/content server 404. In one embodiment, publisher ad server 405 may retrieve the requested content and log the impression, e.g. 418, and then issue a proxy ad retrieval response 419 to SEME reliable delivery ad/content server 404. Thereafter, the SEME reliable delivery ad/content server 404 may transmit the content to client device 402 for use in page rendering, e.g. reliable ad content load response 420. Finally, the client device 402 may utilize the reliably delivered content to complete the rendering of the page content response 413 and thereafter output or display the rendered page and page content to user 401, e.g. reliable page content delivery 421. As illustrated herein, the capabilities of the SEME to provide reliable delivery are not limited to specific media files or types. Instead, the capabilities of the SEME facilitate the delivery of both terminal content files, e.g. files that are not pointers to other files that do not cause other files to be loaded thereafter, as well as the delivery of code, language commands, or other content definition files.

Figure 5:
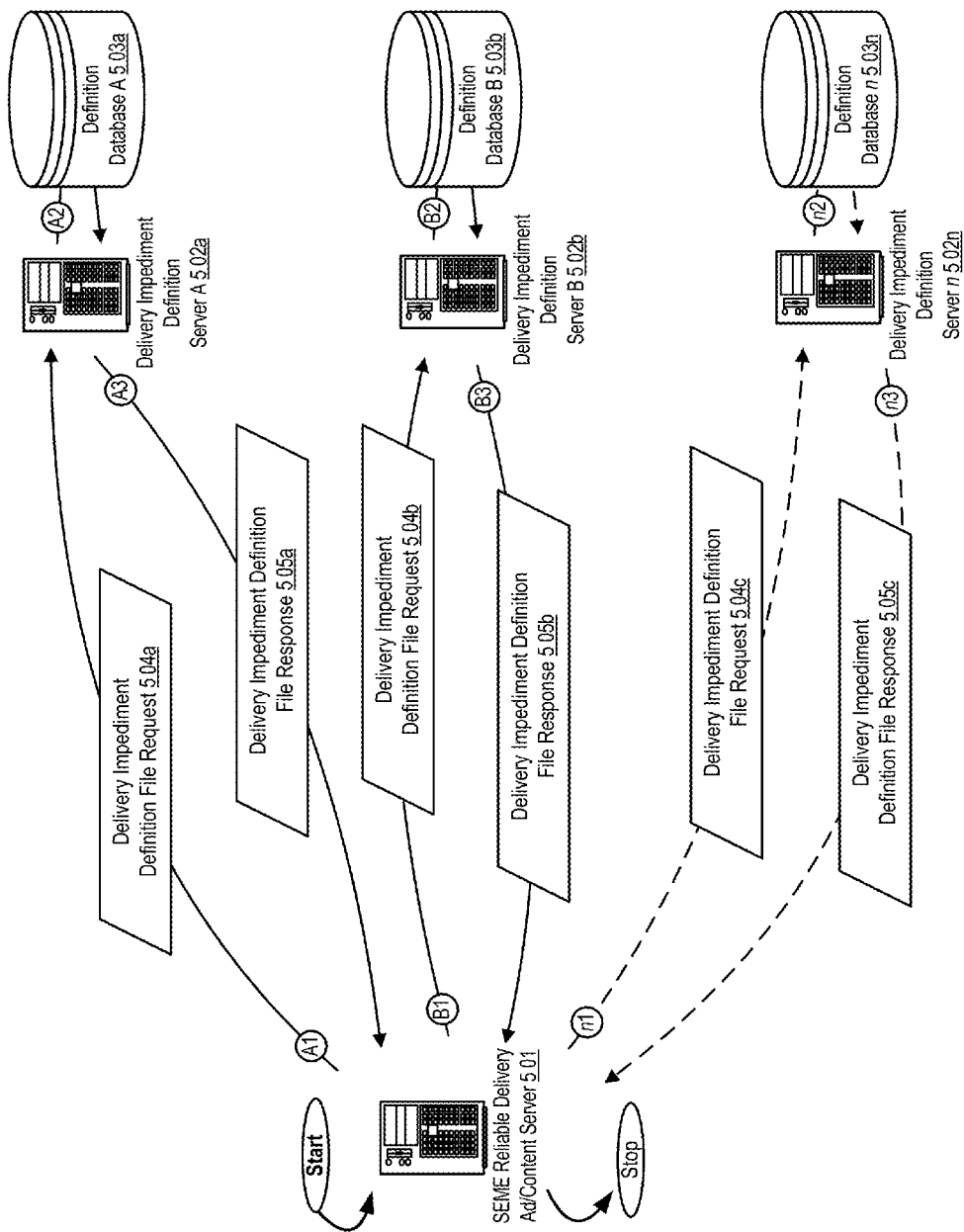
FIG. 5 shows an example data flow illustrating aspects of reliable content delivery impediment definition updating, in one embodiment of the SEME.

FIG. 5 shows an example data flow illustrating aspects of reliable content delivery impediment definition updating, in one embodiment of the SEME. In one embodiment, reliable content delivery may be negatively impacted by various malware and/or blocking software available on the Internet. In some cases, malware relies on a definition database usable to determine whether a given segment of arbitrary text, such as HTML text, is attempting to load content from a given server. In cases where the definition database matches the text, the malware may thereafter substitute its own content in the place of the intended content, may exploit a vulnerability of a publisher or third-party server, may manipulate the intended content prior to display, and/or the like. In order to reduce the effectiveness of malware definition databases, the SEME may in one embodiment periodically retrieve available definitions being used by malware or content blocking software and compare SEME generated reliable delivery code against the definitions in order to ensure a high likelihood that the intended content referenced by the reliable delivery code will not itself also be blocked, that the reliable delivery code will not be blocked, and/or the like. In one embodiment, a definition database may be considered one or more delivery impediment definition files. Delivery impediment definition files may be substantially in the form of text files containing one regular expression per line. Each regular expression corresponds to a single matching rule and may be utilized by malware or other content blocking software to find content suitable for its blocking operations. In order to defeat this capability, in one embodiment, SEME reliable delivery ad/content server 501 may issue a request to delivery impediment definition servers 502a, 502 b, 502n. The delivery impediment definition servers may thereafter query a definition database for the currently active definitions associated with their particular malware and or content blocking software, e.g., 503a, 503b, 503n. In one embodiment, the delivery impediment definition servers may respond with one or more delivery impediment definition file responses, e.g., 505a, 505b, 505c. The SEME reliable delivery ad/content server 501 may then update its local delivery impediment database. An example delivery impediment database schema is provided below with respect to FIG. 9.

Figure 6:
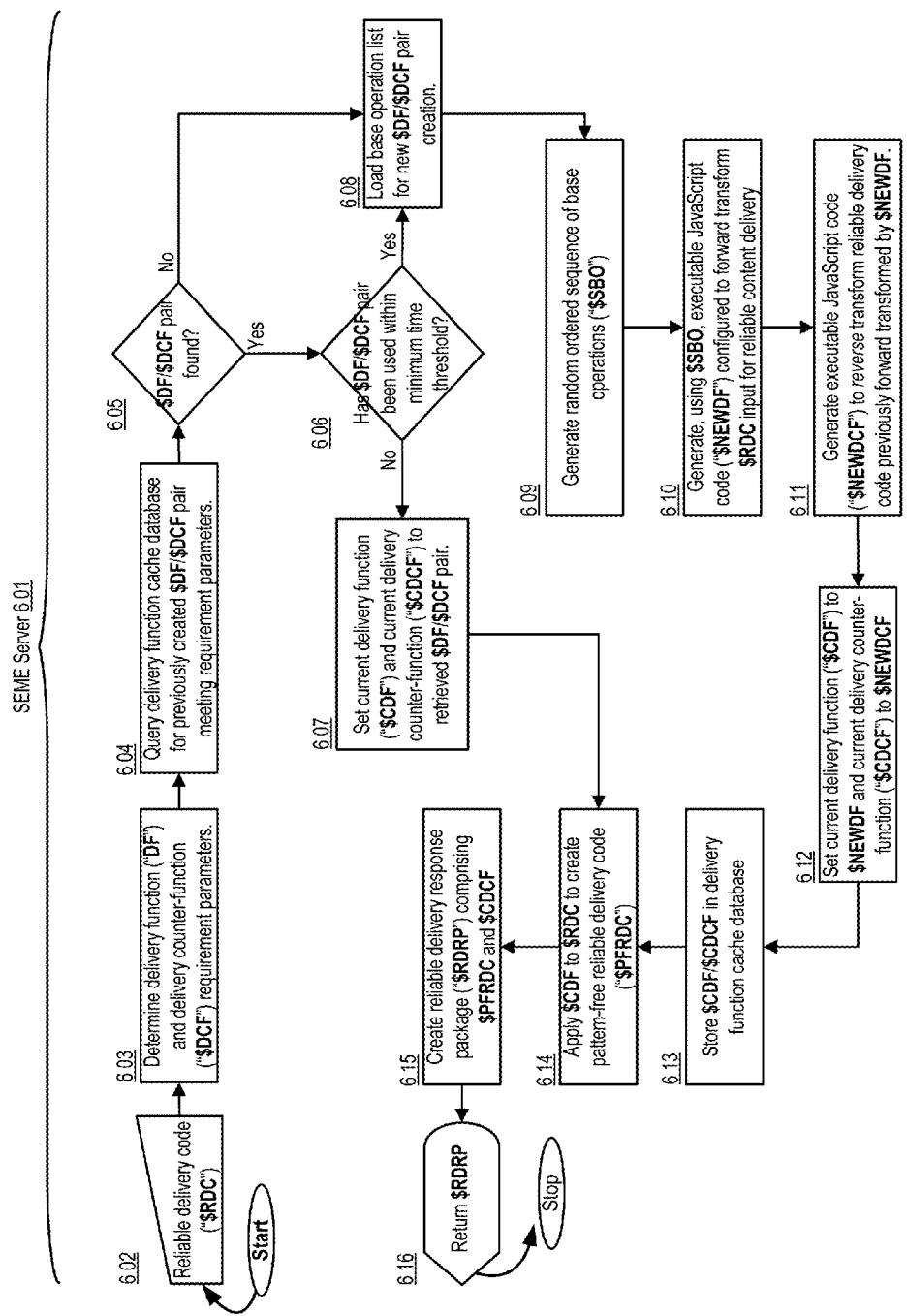
FIG. 6 shows an example logic flow illustrating aspects of delivery function and counter-function code generation, e.g., an example EOB Component, in one embodiment of the SEME.

FIG. 6 shows an example logic flow illustrating aspects of delivery function and counter-function code generation, e.g., an example EOB Component, in one embodiment of the SEME. In one embodiment, SEME server 601 may generate a delivery function/counter-function pair for use in further enhancing the utility of a generated reliable delivery code block, e.g. 602. In one embodiment, the server may determine the required parameters for the delivery function/counter-function pair, e.g. 603. Example parameters include the number of transformations to include in the functions, whether a key is required in order to utilize the counter-function, the expected computational overhead of a function (e.g., a measure of its efficiency), the language the function should be generated in, and/or the like. In one embodiment, the SEME server 601 may have previously generated one or more function/counter-function pairs that meet the required parameters. Therefore, in one embodiment, the SEME server 601 will query a delivery function cache database for a pair meeting the necessary requirement parameters, e.g. 604.

In order to provide function/counter-function services that are resistant to defeat by malware, it may be desirable for a SEME administrator to indicate a time quantum within which a delivery function/counter-function pair should not be reused so as to minimize the amount of different data encoded using the function that may be discerned by observing malware within the time quantum. In one embodiment, if a delivery function/delivery counter-function pair is found, e.g. 605, then the SEME server 601 may determine whether the pair has been used within the minimum time threshold, e.g., 606. If the pair has not been used within the minimum time threshold, e.g. 606, then SEME server 601 may set the current delivery function and the current delivery counter-function to the retrieved delivery function/counter-function pair obtained from the delivery function cache at 604, e.g. 607 (e.g., the cached pair may be reused).

However, if the pair has been used within the minimum time threshold, e.g. 606, then available base operations for use in a new pair's creation may be loaded, e.g. 608. Example base operations include text substitutions, text rotations, format encoding changes, encryption or decryption, hashing functions, and/or any other operation that may be performed on reliable delivery code. In one embodiment, SEME server 601 may generate a random ordered sequence of the available base operations for use in creating the function/counter-function pair, e.g. 609. For example, if ten base operations are to be utilized in the pair then the SEME server may generate ten random numbers and use those numbers to choose among the base operations list in forming the ordered sequence of base operations. In some embodiments, base operations may be excluded from consideration once they have been included in the ordered sequence once. In other embodiments, the ordered sequence of base operations may include the same base operation more than once.

In one embodiment, for each base operation in the ordered sequence, executable JavaScript code may be created to receive text input, perform the base operation on the input, and provide the output of the base operation so that the next base operation in the ordered sequence may be performed. The generation of the executable JavaScript code may, for example, be accomplished by associating an internal JavaScript function (for example: str.replace (/foo/g, "bar")) with each base operation available on the SEME server. Then, a single JavaScript function may be created to include all of the required JavaScript functions associated with the ordered sequence of base operations, and creating a wrapper function that sequentially calls the functions in the ordered sequence and then provides the output of the last function in the ordered sequence as the overall output of the process.

Once the JavaScript code has been generated to forward transform reliable delivery code input, e.g. 610, a second JavaScript function may be generated to perform the base operations in reverse on an input, e.g. 611. In so doing, any browser with access to and permission to execute the reverse transform reliable delivery code function may reverse the operations performed during the forward transform and obtain the original reliable delivery code input provided to the forward transform JavaScript function.

Upon generation of the delivery function (forward transform) and the delivery counter-function (reverse transform), the generated functions may be set to the current delivery function and current delivery counter-functions to be employed for reliable delivery code input 602, e.g. 612. In one embodiment, the current delivery function/counter-function pair may be stored in the function cache database for use again, e.g. 613. For example, some pairs may be reused after a time quantum or for other users. In one embodiment, the reliable delivery code is then transformed using the current delivery function in order to create an output that is configured to be difficult for any delivery impediment definition database (such as that described herein and particularly with respect to FIG. 5) to defeat, e.g. 614. Thereafter, SEME server 601 may provide the transformed reliable delivery code and the current delivery counter-function, e.g. 615, as the response to the delivery function/counter-function code generation request, e.g. 616. In one embodiment, the current delivery function is only stored by SEME server 601 and is not provided to the publisher server or the end-user client device receiving SEME reliable delivery services. In so doing, the SEME may prevent malicious code executing on a client device, such as content blocking malware, from easily defeating the delivery function/counter-function reliable delivery capabilities of the SEME.

Figure 7:
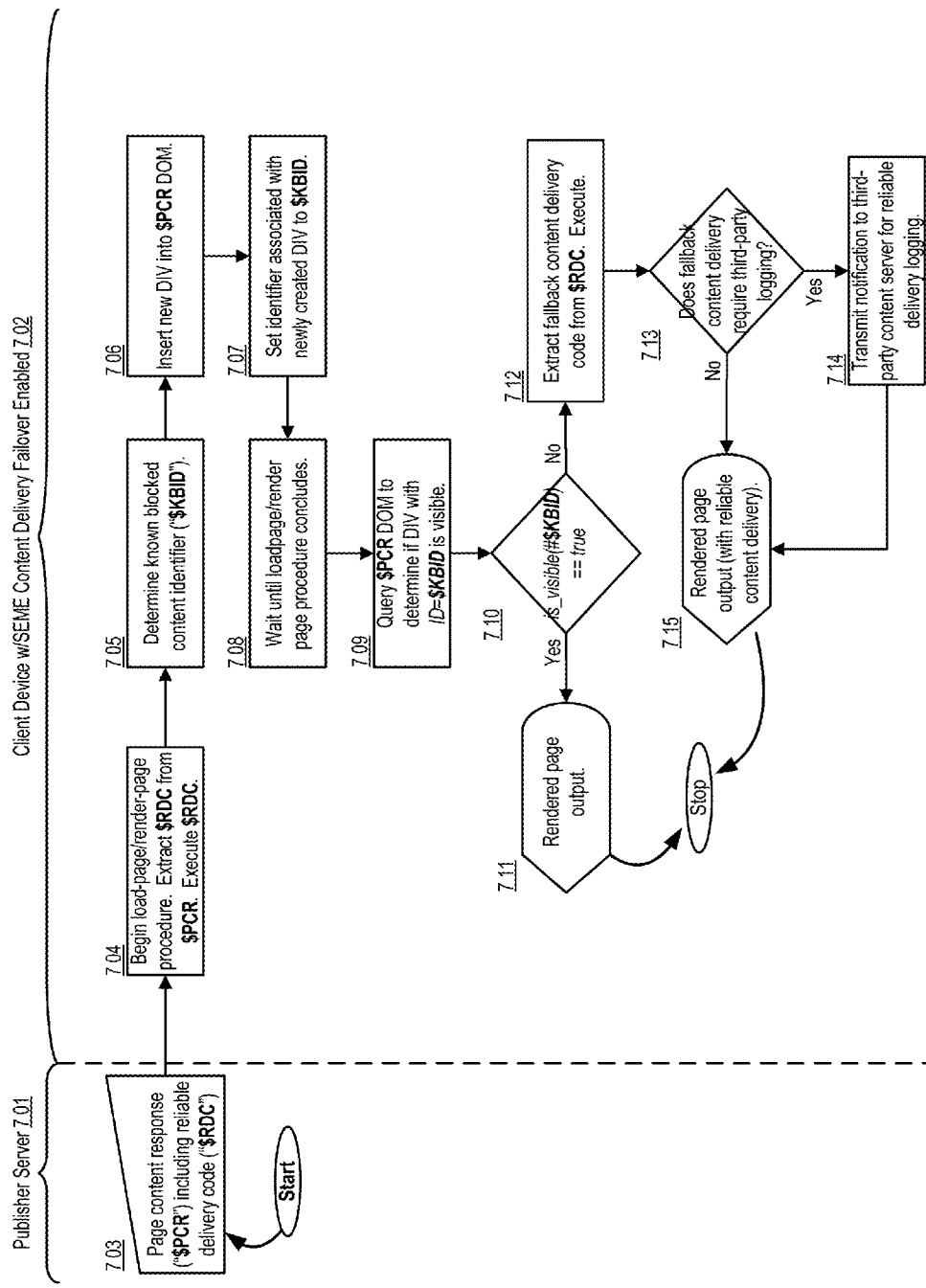
FIG. 7 shows an example logic flow illustrating aspects of content delivery failure detection and reliable delivery recovery, e.g., an example RDF Component, in one embodiment of the SEME.

FIG. 7 shows an example logic flow illustrating aspects of content delivery failure detection and reliable delivery recovery, e.g., an example RDF Component, in one embodiment of the SEME. In one embodiment, the SEME reliable delivery code provided to a publisher and delivered by the publisher to an end user client device may be configured to determine that one or more of the publisher's desired content and/or media files have been blocked from delivery to the client device. Upon detection of such a failure, the SEME reliable delivery code may thereafter request supplemental SEME delivery services. In alternative embodiments, the reliable delivery capabilities discussed herein are not only used in the case where a primary delivery channel is blocked or unavailable. For example, some embodiments may provide reliable delivery services as the primary source of media content for a publisher. In such configurations, the client device need not make a content request and detect a failure to receive the content prior to invoking the reliable delivery capabilities of the SEME. However, as illustrated here, the SEME is operating in a content delivery failover configuration.

In one embodiment, publisher server 701 may provide a page content response including reliable delivery code generated by the SEME 703 to a client device, e.g., client device with SEME content delivery failover capabilities 702. The client device 702 may thereafter begin to load and/or render the page received from publisher server 701, e.g. 704. In so doing, the client device 702 may execute the reliable delivery code generated by the SEME. The reliable delivery code may determine an identifier associated with a known-blocked content identifier, e.g. 705. A content identifier may be, for example, a URL, a DIV ID, and/or the like. In one embodiment, the page that is being rendered may have a new DIV inserted into its document object model ("DOM"), e.g. 706. The known-blocked identifier may then be associated with the newly created DIV, e.g. 707. Such a configuration of the SEME may be used in order to proactively cause malware or other delivery blocking software running on the client device to prevent the display of the known-blocked content and allow the SEME code to detect such blocking. However, inserting a DIV is but one means for the SEME to determine that content has been blocked at or by the client device. For example, in an alternative embodiment, the SEME may be configured to contact a third-party server associated with a piece of content referenced by the page being rendered on the client device. The query to the third-party server may be made directly or may be facilitated through a SEME server acting as a proxy. If the third-party server is configured with SEME capabilities itself, then it may determine that one or more pieces of content have not been delivered to the client device. Such a determination may be, for example, accomplished by inspecting a the web server process request logs of the third-party server (for example, Apache2 access.log).

In one embodiment, the reliable delivery SEME code may then wait until the rendering of the current page concludes on the client device, e.g. 708. In other embodiments, the reliable delivery SEME code may be configured to wait a fixed time quantum independent of the page loading. Thereafter, a query may be made to the DOM to determine if the previously inserted DIV with the known-blocked content identifier is currently visible, e.g. 709. If the DIV is determined to be visible to the client device user, e.g. 710, then content delivery can be assumed to have been successful. In such an instance, the SEME reliable delivery code may then remove the inserted DIV and provide the page or accept the page as the correct rendered page output, e.g. 711. However, if the inserted DIV with the known-blocked content identifier is not visible, e.g. 710, then the SEME code may execute additional commands on the client device to enable fallback content delivery, e.g. 712. Further detail with respect to SEME code for fallback content delivery may be found herein and particularly with respect to FIGS. 2A-B and FIG. 3.

Figure 8:
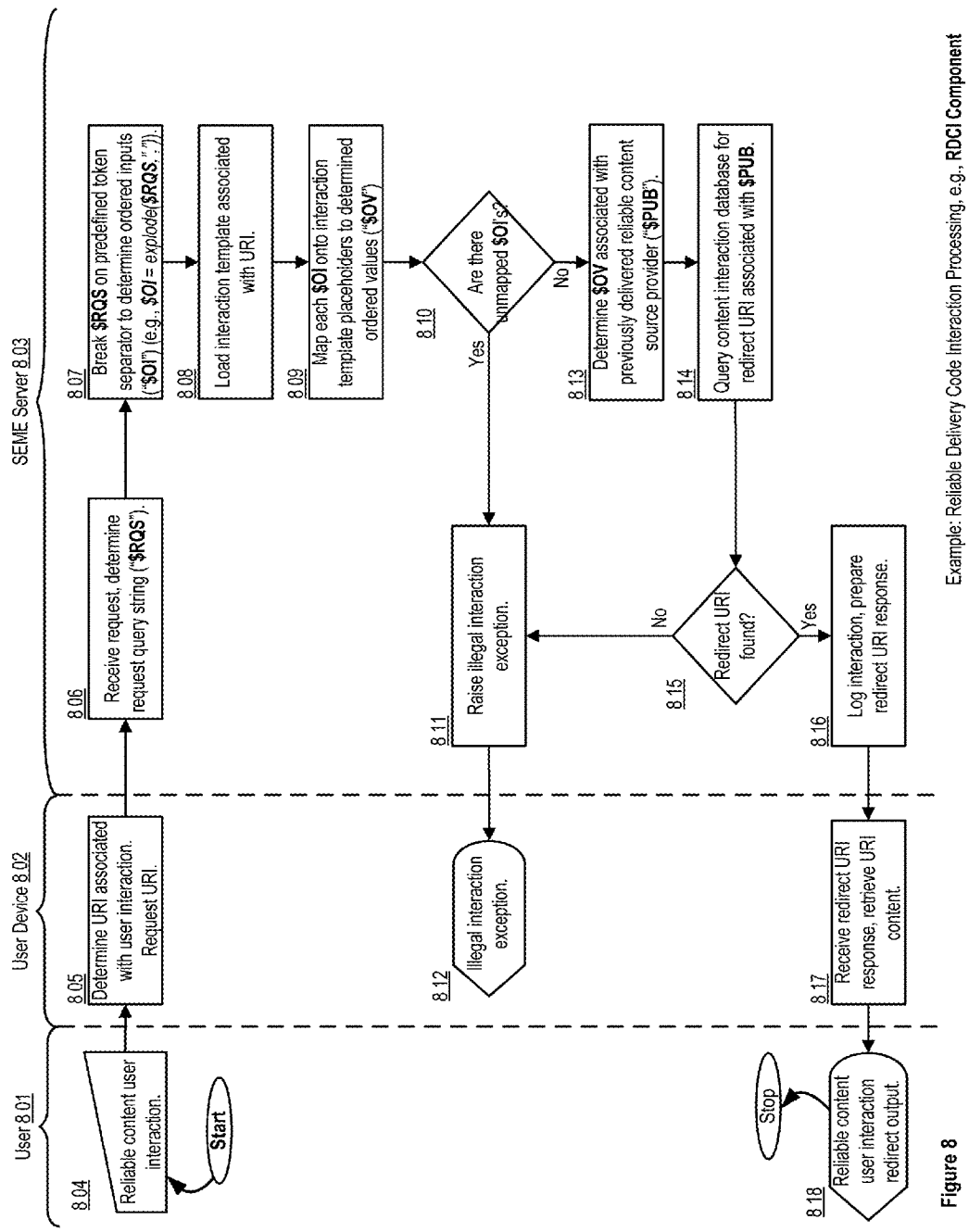
FIG. 8 shows an example logic flow illustrating aspects of reliable delivery code interaction processing, e.g., an example RDCI Component, in one embodiment of the SEME.

FIG. 8 shows an example logic flow illustrating aspects of reliable delivery code interaction processing, e.g., an example RDCI Component, in one embodiment of the SEME. In one embodiment, after the content of a requested page has been loaded by a client device, the loaded content may still utilize SEME capabilities. User interactions with loaded content page components (such as clicking links, and/or the like), may also be hijacked or blocked by malware or content blocking software running on a client device. In one embodiment, a user 801 provides interaction input to user device 802, e.g. reliable content user interaction 804. A user interaction may be a click, a, a double tap, a swipe, a gesture, a voice command, and/or the like. The user device 802 may then determine a URI associated with the given user interaction and request the URI, e.g. 805. While exploiting the reliable delivery capabilities of the SEME, URI requests associated with reliably delivered content may be routed initially to SEME server 803.

In one embodiment, SEME server 803 may receive the request and determine a query string associated with the request, e.g. 806. The query string may be URL-decoded and then broken into an array of values based on a predefined token separator, e.g. 807. A predefined token separator may be employed by the SEME in order to prevent malware running on a client device from detecting patterns in URI endpoint locations and discerning that the content of the endpoint location should be blocked or altered. In one embodiment, the SEME may utilize the ordering of certain values within the request query string in order to determine how to properly handle the URI request. SEME server 803 may load an interaction template associated with the URI, e.g. 808, and map each of the determined ordered inputs onto placeholders in the interaction template, e.g. 809, in order to determine the values associated with certain template placeholders. If there are unmapped ordered inputs, e.g. 810, then the SEME server 803 may raise an illegal interaction exception, e.g. 811, to user device 802, e.g. 812, in order to indicate that the URI request is not serviceable by SEME server 803. However, if there are no unmapped ordered inputs, e.g. 810, then SEME server 803 may determine which of the determined ordered values was previously associated with a reliable content source provider (for example, a publisher), e.g. 813. For example, if the ordered value at query string slot 3 (e.g., the third element in the array after splitting the query string) is a publisher identifier, then that value may be used with others in determining how to process the request. Thereafter, an interaction database may be queried for a redirect URI associated with the reliable content source provider, e.g. 814. In other embodiments, the user interaction may be completely processed by the SEME server 803 itself. If a reliable content source provider redirect URI is not found, e.g. 815, then an illegal interaction exception may be raised and returned the user device 802, e.g. 811-812. In one embodiment, if a redirect URI is found, e.g. 815, then the SEME server 803 may log the user interaction and prepare a URI redirect response, e.g. 816. The user device 802 may receive the redirect response and retrieve the content associated with the URI redirect response location, e.g. 817, and provide or display the output of the reliable content user interaction redirect to user 801, e.g. 818.

SEME Controller

Figure 9:
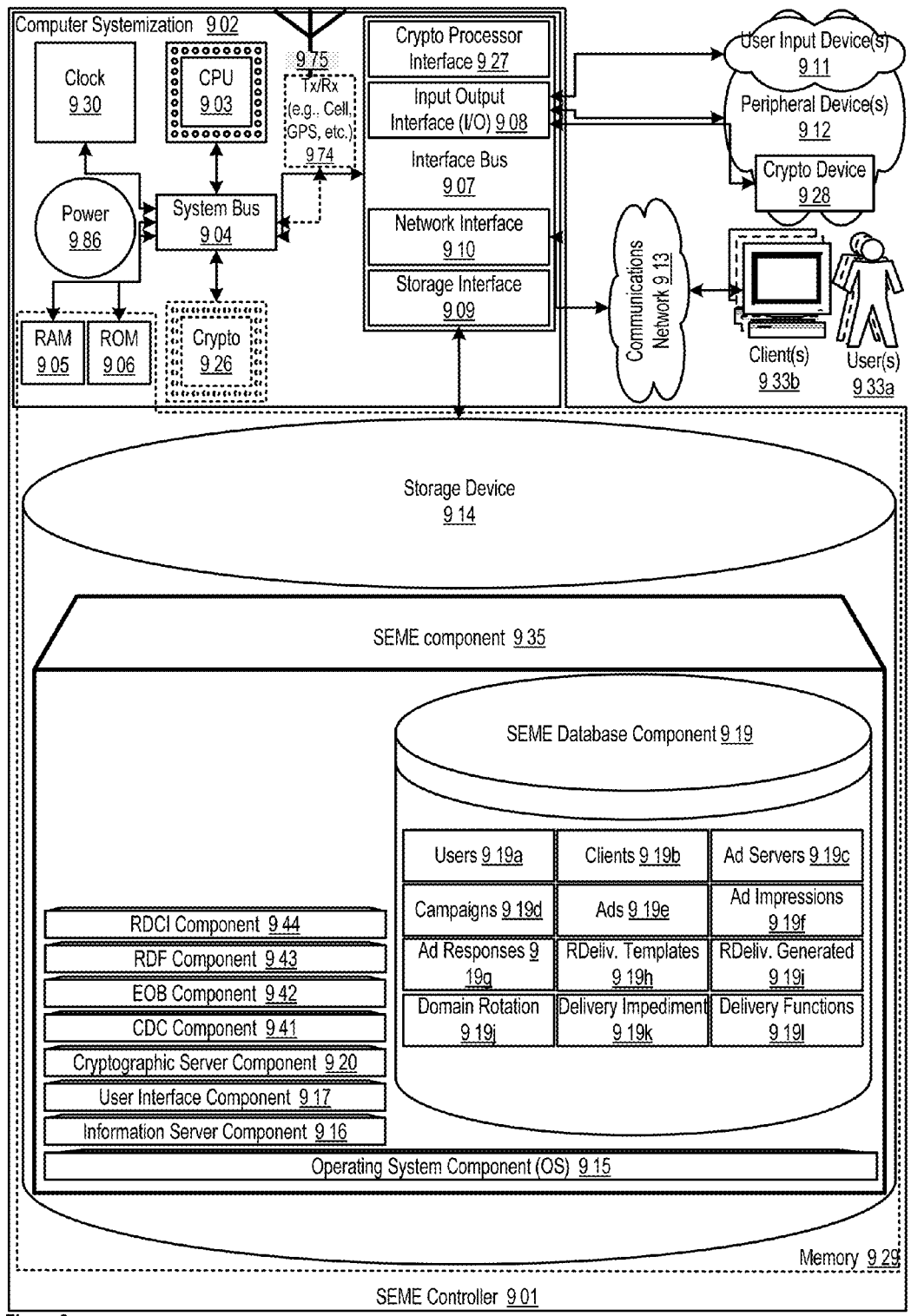
FIG. 9 shows a block diagram illustrating aspects of an exemplary embodiment of a SEME user interface controller, in one embodiment.

FIG. 9 shows a block diagram illustrating embodiments of a SEME controller. In this embodiment, the SEME controller 901 may serve to aggregate, process, store, search, serve, identify, instruct, generate, match, and/or facilitate interactions with a computer through various technologies, and/or other related data. The SEME can, for example, be configured such that the various components described herein execute on both (or any of) user client device 302/402 and SEME server 305/404. Because each component of the SEME may be distributed, as described below, the user client device 302/402 and the SEME server 305/404 may perform portions of the program logic assigned to them or portions of the program logic normally assigned to the other. In another example, the SEME CDC Component 741 (described above with respect to FIGS. 2A-B) can execute on SEME server 305/404 as shown. In an alternative configuration, the SEME CDC Component 741 may be installed on user client device 302/402 or publisher ad server 304/405 and provide services to SEME server 305/404 via the networked program execution capabilities described below.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SEME controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SEME controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SEME controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SEME controller and beyond through various interfaces. Should processing requirements dictate a greater amount speed and/or capacity, distributed processors (e.g., Distributed SEME), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the SEME may be achieved by implementing a microcontroller such as CAST's R8051 XC2 microcontroller; Intel's MCS 51 (i.e., 8051 microcontroller); and/or the like. Also, to implement certain features of the SEME, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SEME component collection (distributed or otherwise) and/or features may be implemented via the microprocessor and/or via embedded components; e.g., via ASIC, coprocessor, DSP, FPGA, and/or the like. Alternately, some implementations of the SEME may be implemented with embedded components that are configured and used to achieve a variety of features or signal processing.

Depending on the particular implementation, the embedded components may include software solutions, hardware solutions, and/or some combination of both hardware/software solutions. For example, SEME features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SEME features. A hierarchy of programmable interconnects allow logic blocks to be interconnected as needed by the SEME system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SEME may be developed on regular FPGAs and then migrated into a fixed version that more resembles ASIC implementations. Alternate or coordinating implementations may migrate SEME controller features to a final ASIC instead of or in addition to FPGAs. Depending on the implementation all of the aforementioned embedded components and microprocessors may be considered the "CPU" and/or "processor" for the SEME.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the SEME thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the SEME controller is accessible through remote clients 933*b* (e.g., computers with web browsers) by users 933*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SEME), architectures may similarly be employed to pool, load balance, and/or otherwise increase the communicative bandwidth required by the SEME controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the SEME controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SEME controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the SEME controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the SEME controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component 915; information server component 916; user interface component 917; SEME database component 919; cryptographic server component 920; CDC component 941; EOB component 942; RDF component 943; RDCI component 944; and/or the like (i.e., collectively a component collection). The aforementioned components may be incorporated into (e.g., be sub-components of), loaded from, loaded by, or otherwise operatively available to and from the SEME component(s) 935.

Any component may be stored and accessed from the storage devices and/or from storage devices accessible through an interface bus. Although program components such as those in the component collection, typically, are stored in a local storage device 914, they may also be loaded and/or stored in other memory such as: remote "cloud" storage facilities accessible through a communications network; integrated ROM memory; via an FPGA or ASIC implementing component logic; and/or the like.

Operating System Component

The operating system component 915 is an executable program component facilitating the operation of the SEME controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, OpenBSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/2003/3.1/95/98/CE/Millenium/NT/Vista/XP/Win7 (Server), and/or the like. An operating system may communicate to and/or with other components in a component collection, including itself, and/or the like. Most frequently, the operating system communicates with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the SEME controller to communicate with other entities through a communications network 913. Various communication protocols may be used by the SEME controller as a subcarrier transport mechanism for interaction, such as, but not limited to: multicast, TCP/IP, UDP, unicast, and/or the like.

Information Server Component

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective–) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SEME controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SEME database component 919, operating system component 915, other program components, user interfaces, and/or the like.

Access from the Information Server Component 916 to the SEME database component 919 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SEME. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SEME as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating system component 915, other program components, and/or the like. The user interface may contain, communicate, generate, obtain, and/or provide program component, system, user, and/or data communications, requests, and/or responses.

Cryptographic Server Component

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like. Employing such encryption security protocols, the SEME may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SEME component to engage in secure transactions if so desired. The cryptographic component facilitates the secure accessing of resources on the SEME and facilitates the access of secured resources on remote systems; i.e., it may act as a client and/or server of secured resources. Most frequently, the cryptographic component communicates with information server component 916, operating system component 915, other program components, and/or the like. The cryptographic component may contain, communicate, generate, obtain, and/or provide program component, system, user, and/or data communications, requests, and/or responses.

SEME Database Component

The SEME database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SEME database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-l*. A Users table 919*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. A Clients table 919*b* may include fields such as, but not limited to: client_id, client_name, client_ip, client_type, client_model, operating_system, os_version, app_installed_flag, and/or the like. An Ad Servers table 919*c* may include fields such as, but not limited to: ad_server_id, server_name, server_role, server_capabilities, server_IP_address, and/or the like. A Campaigns table 919*d* may include fields such as, but not limited to: campaign_id, campaign_name, ad_server_id, client_id, campaign_type, total_spend, time_start, time_end, campaign permissions, targeting function, and/or the like. An Ads table 919*e* may include fields such as, but not limited to: ad_id, campaign_id, source_file, cdn_location_base, last_served, ad_history, and/or the like. An Ad Impressions table 919*f* may include fields such as, but not limited to: adimp_id, ad_id, user_id, campaign_id, time_served, target_link, expires_time, url, and/or the like. An Ad Responses table 919*g* may include fields such as, but not limited to: adresp_id, adimp_id, ad_id, campaign_id, time_response, response_type, user_id, followup_action, and/or the like. A Reliable Delivery Templates table 919*h* may include fields such as, but not limited to: rtmpl_id, rtmpl_content, tmpl_permissions, owner_user_id, user_id, and/or the like. An Reliable Delivery Generated table 919*i* may include fields such as, but not limited to: rgen_id, rgen_content, rtmpl_id_used, user_id, campaign_id, ad_id, and/or the like. A Domain Rotation table 919*j* may include fields such as, but not limited to: dr_id, domain_name, registrar, is_active, dns_last_updated, price, domain_route_policy, domain_route_rule, last checked impediment definitions, and/or the like. A Delivery Impediment table 919*k* may include fields such as, but not limited to: impdmt_id, rules, rules_regex, rules_executable, rules_code, rule_source, matching_domain_ids, last_updated and/or the like. A Delivery Functions table 919*l* may include fields such as, but not limited to: delivery_function_id, funct_lang, funct_code, counterfunct_lang, counterfunct_code, user_id, client_id, campaign_id, ad_id, last_used_datetime, permissions, transformations, base operations, parent_func_id, and/or the like. Any of the aforementioned tables may support and/or track multiple entities, accounts, users and/or the like.

In one embodiment, the SEME database component may interact with other database systems. For example, when employing a distributed database system. In such an embodiment, queries and data access by any SEME component may treat the combination of the SEME database component results and results from a second segment in a distributed database system as an integrated database layer. Such a database layer may be accessed as a single database entity, for example through SEME database component 919, by any SEME component.

In one embodiment, user programs may contain various user interface primitives, which may serve to update the SEME. Also, various accounts may require custom database tables depending upon the environments and the types of clients the SEME may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-l*. The SEME may be configured to keep track of various settings, inputs, and parameters via database controllers.

The SEME database may communicate to and/or with other components in a component collection, including itself, and/or facilities of the like. Most frequently, the SEME database communicates with the SEME component, other program components, and/or the like. The database may contain, retain, and provide information regarding other nodes and data.

SEME Component

The SEME component 935 is a stored program component that is executed by a CPU. In one embodiment, the SEME component incorporates any and/or all combinations of the aspects of the SEME that was discussed in the previous figures. As such, the SEME affects accessing, obtaining and the provision of information, services, transactions, and/or the like across various communications networks. The features and embodiments of the SEME discussed herein increase network efficiency by reducing data transfer requirements the use of more efficient data structures and mechanisms for their transfer and storage. As a consequence, more data may be transferred in less time, and latencies with regard to data processing operations and transactions, are also reduced. In many cases, such reduction in storage, transfer time, bandwidth requirements, latencies, etc., will reduce the capacity and structural infrastructure requirements to support the SEME's features and facilities, and in many cases reduce the costs, energy consumption/ requirements, and extend the life of SEME's underlying infrastructure; this has the added benefit of making the SEME more reliable. Similarly, many of the features and mechanisms are designed to be easier for users to use and access, thereby broadening the audience that may enjoy/ employ and exploit the feature sets of the SEME; such ease of use also helps to increase the reliability of the SEME. In addition, the feature sets include heightened security as noted via the Cryptographic components 920, 926, 928 and throughout, making access to the features and data more reliable and secure.

The SEME component may transform reliable content delivery requests, and/or the like, via various components described herein, into reliable electronic delivery injection package and electronic media content file delivery service outputs. In one embodiment, the SEME component 935 takes inputs (e.g., load page navigation input 306, page content request 307, reliable delivery JS request 308, reliable ad content load request 316, proxy ad retrieval request 417, delivery impediment definition file request 504*a-c*, and/or the like) etc., and transforms the inputs via various components (e.g., CDC Component 741, EOB Component 742, RDF Component 743, RDCI Component 744 and/or the like), into outputs (e.g., reliable delivery JS response 311, page content response 313, reliable ad content load response 318, reliable page content delivery 319, proxy ad retrieval response 419, delivery impediment definition file response 505*a-c* and/or the like).

The SEME component enabling access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; Yahoo! User Interface; and/or the like), WebObjects, and/or the like. In one embodiment, the SEME server employs a cryptographic server to encrypt and decrypt communications. The SEME component may communicate to and/or with other components in a component collection, including itself, and/or facilities of the like. Most frequently, the SEME component communicates with the SEME database component 919, operating system component 915, other program components, and/or the like. The SEME may contain, communicate, generate, obtain, and/or provide program component, system, user, and/or data communications, requests, and/or responses.

Distributed SEME Components

The structure and/or operation of any of the SEME node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SEME controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Further, the parsing grammar may be used beyond message parsing, but may also be used to parse: databases, data collections, data stores, structured data, and/or the like. Again, the desired configuration will depend upon the context, environment, and requirements of system deployment.

Additional SEME Configurations

In order to address various issues and advance the art, the entirety of this application for SEME (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SEME individual and/or enterprise user, database configuration and/or relational model, data type, data transmission and/or network framework, syntax structure, and/or the like, various embodiments of the SEME, may be implemented that enable a great deal of flexibility and customization as described herein.

What is claimed is:

1. A processor-implemented method for reliable electronic content delivery in a malware or content blocked computer environment, the method comprising:
receiving a request, from an electronic media publisher, for a reliable electronic content delivery injection package;
determining, via a processor, a content insertion template associated with the electronic media publisher, wherein the content insertion template is configured to enable failover electronic content delivery in the malware or content blocked computer environment;
querying a domain rotation database for a non-blocked and routable domain link;
creating, using the non-blocked and routable domain link, a content endpoint link;
populating, via the processor, the content insertion template, using the content endpoint link, to create a content insertion block;
generating the reliable electronic delivery injection package by substituting, for a plurality of elements in the content insertion block, a plurality of random value strings, wherein each of the plurality of random value strings corresponds to an element used in the content insertion block and does not correspond to a programming language reserved keyword used in the content insertion block; and
providing the reliable electronic delivery injection package to the electronic media publisher for inclusion by the electronic media publisher in a web page being served to a third-party user.

2. The method of claim 1, wherein creating the content endpoint link comprises:
determining a plurality of elements to append to the non-blocked and routable domain link and an order for the plurality of elements to append; and
appending, to the non-blocked and routable domain link, in the determined order, values corresponding to each of the plurality of elements.

3. The method of claim 1, additionally comprising:
receiving, from the third-party user, a request to provide reliable electronic content delivery; and
providing, in response to the request to provide reliable electronic content delivery, delivery services for at least one electronic media content file to the third-party user.

4. The method of claim 3, wherein the at least one electronic media content file is one or more of the following:
an image file;
a video file;
an XML file;
a VAST file;
a pointer to an image file;
a pointer to a video file;
a pointer to an XML file;
a pointer to a VAST file;
a tracker file;
URL;
an HTML file;
a content definition file; and
a web page.

5. The method of claim 4, wherein the at least one electronic media content file comprises an advertisement for an advertiser.

6. The method of claim 4, wherein the at least one electronic media content file comprises a link that is routable to the web site of an advertiser.

7. The method of claim 6, further comprising:
receiving a request to route the third-party user to the web site of the advertiser;
determining, based on the order of the parameters in the request to route the third-party user to the web site of the advertiser, the identity of the electronic media publisher that provided the reliable electronic delivery injection package to the third-party user and a routable target link for the advertiser;
updating a record associated with the electronic media publisher; and
redirecting the third-party user to the routable target link for the advertiser.

8. The method of claim 1, further comprising:
creating a reliable delivery transformation function and reliable delivery transformation counter-function, wherein the reliable delivery transformation function is configured to perform a plurality of textual transformation operations to convert a first text segment into a second text segment and the reliable delivery transformation counter-function is configured to perform the plurality of textual transformation operations in reverse order to convert the second text segment into the first text segment;
converting, using the reliable delivery transformation function, at least one portion of the reliable electronic delivery injection package; and
providing the reliable delivery transformation counter-function to the electronic media publisher.

9. The method of claim 8, wherein creating the reliable delivery transformation function and reliable delivery transformation counter-function, comprises:
determining a plurality of base text manipulation operations and an order for the operations;
generating a first segment of dynamic scripting language code sufficient to perform, on a first textual input, the plurality of base text manipulation operations in the determined order; and
generating a second segment of dynamic scripting language code sufficient to perform, on a second textual input, the plurality of base text manipulation operations in the reverse of the determined order.

10. A processor-implemented method for reliable electronic content delivery in a malware or content blocked computer environment, the method comprising:
receiving a request, from an electronic media publisher, for a reliable electronic content delivery injection package;
determining, via a processor, a content insertion template associated with the electronic media publisher, wherein the content insertion template is configured to enable failover electronic content delivery in the malware or content blocked computer environment;
querying a domain rotation database for a non-blocked and routable domain link;
creating, using the non-blocked and routable domain link, a content endpoint link;
populating, via the processor, the content insertion template, using the content endpoint link, to create a content insertion block;
generating the reliable electronic delivery injection package by substituting, for a plurality of elements in the content insertion block, a plurality of random value strings, wherein each of the plurality of random value strings corresponds to an element used in the content insertion block and does not correspond to a programming language reserved keyword used in the content insertion block;

providing the reliable electronic delivery injection package to the electronic media publisher for inclusion by the electronic media publisher in a web page being served to a third-party user;

receiving, in response to the query for a non-blocked and routable domain link, an indication that the domain rotation database does not have an available non-blocked and routable domain link;

determining a randomized available unpurchased domain name, wherein determining comprises generating a random or pseudo-random potential domain name and querying a domain registrar database to determine that the potential domain name is available and unpurchased;

initiating a real-time purchase of the randomized available unpurchased domain name;

inserting the purchased domain name in the domain rotation database; and providing the purchased domain name as the non-blocked and routable domain link.

11. A reliable electronic content delivery in a malware or content blocked computer environment apparatus, comprising:

a memory; and a processor disposed in communication with said memory, and configured to issue a plurality of processing instructions stored in the memory, wherein the processor issues instructions to:

receive a request, from an electronic media publisher, for a reliable electronic content delivery injection package;

determine a content insertion template associated with the electronic media publisher, wherein the content insertion template is configured to enable failover electronic content delivery in the malware or content blocked computer environment;

query a domain rotation database for a non-blocked and routable domain link;

create, using the non-blocked and routable domain link, a content endpoint link;

populate the content insertion template, using the content endpoint link, to create a content insertion block;

generate the reliable electronic delivery injection package by substituting, for a plurality of elements in the content insertion block, a plurality of random value strings, wherein each of the plurality of random value strings corresponds to an element used in the content insertion block and does not correspond to a programming language reserved keyword used in the content insertion block; and provide the reliable electronic delivery injection package to the electronic media publisher for inclusion by the electronic media publisher in a web page being served to a third-party user.

12. The apparatus of claim 11, wherein instructions to create the content endpoint link comprises instructions to:

determine a plurality of elements to append to the non-blocked and routable domain link and an order for the plurality of elements to append; and append, to the non-blocked and routable domain link, in the determined order, values corresponding to each of the plurality of elements.

13. The apparatus of claim 11, additionally comprising instructions to:

receive, from the third-party user, a request to provide reliable electronic content delivery; and provide, in response to the request to provide reliable electronic content delivery, delivery services for at least one electronic media content file to the third-party user.

14. The apparatus of claim 13, wherein the at least one electronic media content file is one or more of the following:

an image file;
a video file;
an XML file;
a VAST file;
a pointer to an image file;
a pointer to a video file;
a pointer to an XML file;
a pointer to a VAST file;
a tracker file;
URL;
an HTML file;
a content definition file; and
a web page.

15. The apparatus of claim 14, wherein the at least one electronic media content file comprises an advertisement for an advertiser.

16. The apparatus of claim 14, wherein the at least one electronic media content file comprises a link that is routable to the web site of an advertiser.

17. The apparatus of claim 16, further comprising instructions to:

receive a request to route the third-party user to the web site of the advertiser;

determine, based on the order of the parameters in the request to route the third-party user to the web site of the advertiser, the identity of the electronic media publisher that provided the reliable electronic delivery injection package to the third-party user and a routable target link for the advertiser;

update a record associated with the electronic media publisher; and redirect the third-party user to the routable target link for the advertiser.

18. The apparatus of claim 11, further comprising instructions to:

create a reliable delivery transformation function and reliable delivery transformation counter-function, wherein the reliable delivery transformation function is configured to perform a plurality of textual transformation operations to convert a first text segment into a second text segment and the reliable delivery transformation counter-function is configured to perform the plurality of textual transformation operations in reverse order to convert the second text segment into the first text segment;

convert, using the reliable delivery transformation function, at least one portion of the reliable electronic delivery injection package; and provide the reliable delivery transformation counter-function to the electronic media publisher.

19. The apparatus of claim 18, wherein instructions to create the reliable delivery transformation function and reliable delivery transformation counter-function, comprises instructions to:

determine a plurality of base text manipulation operations and an order for the operations;

generate a first segment of dynamic scripting language code sufficient to perform, on a first textual input, the plurality of base text manipulation operations in the determined order; and generate a second segment of dynamic scripting language code sufficient to perform, on a second textual input, the plurality of base text manipulation operations in the reverse of the determined order.

20. A reliable electronic content delivery in a malware or content blocked computer environment apparatus, comprising:

a memory; and a processor disposed in communication with said memory, and configured to issue a plurality of processing instructions stored in the memory, wherein the processor issues instructions to:

receive a request, from an electronic media publisher, for a reliable electronic content delivery injection package;

determine a content insertion template associated with the electronic media publisher, wherein the content insertion template is configured to enable failover electronic content delivery in the malware or content blocked computer environment;

query a domain rotation database for a non-blocked and routable domain link;

create, using the non-blocked and routable domain link, a content endpoint link;

populate the content insertion template, using the content endpoint link, to create a content insertion block;

generate the reliable electronic delivery injection package by substituting, for a plurality of elements in the content insertion block, a plurality of random value strings, wherein each of the plurality of random value strings corresponds to an element used in the content insertion block and does not correspond to a programming language reserved keyword used in the content insertion block;

provide the reliable electronic delivery injection package to the electronic media publisher for inclusion by the electronic media publisher in a web page being served to a third-party user;

receive, in response to the query for a non-blocked and routable domain link, an indication that the domain rotation database does not have an available non-blocked and routable domain link;

determine a randomized available unpurchased domain name, wherein determining comprises generating a random or pseudo-random potential domain name and querying a domain registrar database to determine that the potential domain name is available and unpurchased;

initiate a real-time purchase of the randomized available unpurchased domain name;

insert the purchased domain name in the domain rotation database; and provide the purchased domain name as the non-blocked and routable domain link.

* * * * *